(12) United States Patent
Hoofard et al.

(10) Patent No.: US 12,454,426 B2
(45) Date of Patent: Oct. 28, 2025

(54) CONTROL SYSTEMS FOR OPERATION OF LOADING DOCK EQUIPMENT, AND ASSOCIATED METHODS OF MANUFACTURE AND USE

(71) Applicant: ASSA ABLOY Entrance Systems AB, Landskrona (SE)

(72) Inventors: Richard K. Hoofard, Dallas, TX (US); Brett A. Walford, Corinth, TX (US); Stephen Kosek, Fort Worth, TX (US); Daryl Day, Frisco, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 0 days.

(21) Appl. No.: 18/433,152

(22) Filed: Feb. 5, 2024

(65) Prior Publication Data
US 2024/0246782 A1    Jul. 25, 2024

Related U.S. Application Data

(63) Continuation of application No. 17/693,997, filed on Mar. 14, 2022, now Pat. No. 11,926,497, which is a
(Continued)

(51) Int. Cl.
*B65G 69/00* (2006.01)
*B65G 69/28* (2006.01)
*G06F 3/048* (2013.01)

(52) U.S. Cl.
CPC ......... *B65G 69/008* (2013.01); *B65G 69/005* (2013.01); *B65G 69/2882* (2013.01); *G06F 3/048* (2013.01)

(58) Field of Classification Search
CPC .. B65G 9/008; B65G 69/005; B65G 69/2882; G06F 3/048
See application file for complete search history.

(56) References Cited

U.S. PATENT DOCUMENTS

| 1,775,909 A | 9/1930 | Mikkelsen |
| 2,362,981 A | 11/1944 | Philemon |

(Continued)

FOREIGN PATENT DOCUMENTS

| CA | 2963656 A1 | 11/2017 |
| CA | 3067610 A1 | 7/2020 |

(Continued)

OTHER PUBLICATIONS

Dock Lighting Goes Green with the FT Ultra LED Docklight, APS Resource, News Release. 1 page.
(Continued)

*Primary Examiner* — William L Bashore
*Assistant Examiner* — Gregory A Distefano
(74) *Attorney, Agent, or Firm* — Perkins Coie LLP

(57) ABSTRACT

Systems and associated methods for controlling operation of loading dock equipment are described herein. In some embodiments, the system and associated methods can be used to control operation of loading dock equipment (e.g., a vehicle restraint, a dock door, a dock leveler, etc.) according to a sequence of operations. The sequence of operations can include different sub-sequences based on loading dock conditions. The system can include a display screen that sequentially presents a series of control elements that enable operation of the loading dock equipment. Additionally, the visual appearance and/or sequence of presentation of the control elements indicate the proper sequence of selection to the user, thereby reducing user confusion and simplifying the operation of the loading dock equipment. Some functionality of the control panel can be enabled or disabled based on a current level of authorization.

20 Claims, 28 Drawing Sheets

Related U.S. Application Data continuation of application No. 16/245,172, filed on Jan. 10, 2019, now Pat. No. 11,305,953, which is a continuation-in-part of application No. 15/145,605, filed on May 3, 2016, now Pat. No. 11,225,824.

(56) References Cited

U.S. PATENT DOCUMENTS

| | | |
|---|---|---|
| 3,439,728 A | 4/1969 | Martini |
| 3,635,277 A | 1/1972 | Bahnsen |
| 3,894,571 A | 7/1975 | Hinchliff |
| 4,009,051 A | 2/1977 | Kazis et al. |
| 4,010,571 A | 3/1977 | Mcguire et al. |
| 4,286,911 A | 9/1981 | Benjamin |
| 4,476,853 A | 10/1984 | Arbogast |
| 4,590,118 A | 5/1986 | Yatabe et al. |
| 4,625,456 A | 12/1986 | Lafontaine |
| 4,626,983 A | 12/1986 | Harada et al. |
| 4,661,758 A | 4/1987 | Whittaker |
| 4,744,121 A | 5/1988 | Swessel et al. |
| 4,843,373 A | 6/1989 | Trickle et al. |
| 4,936,731 A | 6/1990 | Noble |
| 4,988,254 A | 1/1991 | Alexander |
| 5,026,242 A | 6/1991 | Alexander |
| 5,047,748 A | 9/1991 | Trickle |
| 5,056,847 A | 10/1991 | Stillwell et al. |
| 5,168,262 A | 12/1992 | Okayama |
| 5,168,267 A | 12/1992 | Trickle |
| 5,181,401 A | 1/1993 | Hodan |
| 5,277,240 A | 1/1994 | Epema et al. |
| 5,323,098 A | 6/1994 | Hamaguchi et al. |
| 5,403,142 A | 4/1995 | Stewart |
| 5,495,102 A | 2/1996 | Fine |
| 5,565,843 A | 10/1996 | Meyvis |
| 5,576,533 A | 11/1996 | Tantraporn |
| 5,775,107 A | 7/1998 | Sparkman |
| 5,831,540 A | 11/1998 | Sullivan et al. |
| 5,886,863 A | 3/1999 | Nagasaki et al. |
| 5,886,883 A | 3/1999 | Rail |
| 5,898,585 A | 4/1999 | Sirichote et al. |
| 5,915,446 A | 6/1999 | De |
| 6,082,952 A | 7/2000 | Alexander |
| 6,125,582 A | 10/2000 | Mondragon et al. |
| 6,134,835 A | 10/2000 | Krupke et al. |
| 6,179,036 B1 | 1/2001 | Harvey |
| 6,276,744 B1 | 8/2001 | Huber et al. |
| 6,367,259 B1 | 4/2002 | Timm |
| 6,369,462 B1 | 4/2002 | Siri |
| 6,390,245 B1 | 5/2002 | Metz |
| 6,442,897 B1 | 9/2002 | Mullet |
| 6,476,572 B2 | 11/2002 | Lounsbury |
| 6,523,823 B1 | 2/2003 | Bakoledis |
| 6,543,375 B1 | 4/2003 | Sargent et al. |
| 6,663,527 B2 | 12/2003 | Phelan et al. |
| 6,750,884 B1 * | 6/2004 | Steigerwald ........... G09B 19/00 715/762 |
| 6,781,516 B2 | 8/2004 | Reynard et al. |
| 6,787,259 B2 | 9/2004 | Colborn et al. |
| 6,810,817 B1 | 11/2004 | James |
| 6,812,849 B1 | 11/2004 | Ancel |
| 6,917,298 B2 | 7/2005 | Romano et al. |
| 6,972,226 B2 | 12/2005 | Deppe et al. |
| 6,975,226 B2 | 12/2005 | Reynard et al. |
| 7,032,720 B2 | 4/2006 | Jette et al. |
| 7,045,764 B2 | 5/2006 | Beggs et al. |
| 7,119,673 B2 | 10/2006 | Eager et al. |
| 7,162,762 B1 | 1/2007 | Gleason |
| 7,165,486 B2 | 1/2007 | Alexander et al. |
| 7,230,819 B2 | 6/2007 | Muchow et al. |
| 7,254,868 B2 | 8/2007 | Mullet et al. |
| 7,256,703 B2 | 8/2007 | Duvernell et al. |
| 7,264,092 B2 | 9/2007 | Jette |
| 7,274,300 B2 | 9/2007 | Duvernell et al. |
| 7,327,107 B2 | 2/2008 | Mullet et al. |
| 7,333,016 B2 | 2/2008 | Ancel |
| 7,380,375 B2 | 6/2008 | Maly |
| 7,686,061 B2 | 3/2010 | Mullet et al. |
| 7,730,981 B2 | 6/2010 | Mccabe et al. |
| 7,750,890 B2 | 7/2010 | Fitzgibbon et al. |
| 7,864,030 B2 | 1/2011 | Jette |
| 7,956,718 B2 | 6/2011 | Murphy et al. |
| 8,058,970 B2 | 11/2011 | Mullet et al. |
| 8,065,770 B2 | 11/2011 | Proffitt et al. |
| 8,112,949 B2 | 2/2012 | Eungard |
| 8,181,401 B2 | 5/2012 | Eungard |
| 8,286,757 B2 | 10/2012 | Nelson |
| 8,307,589 B2 | 11/2012 | Eungard |
| 8,307,956 B2 | 11/2012 | Andersen et al. |
| 8,345,010 B2 | 1/2013 | Fitzgibbon et al. |
| 8,364,334 B2 | 1/2013 | Au et al. |
| 8,407,842 B2 | 4/2013 | Story et al. |
| 8,410,895 B2 | 4/2013 | Murphy et al. |
| 8,490,669 B2 | 7/2013 | Fletcher et al. |
| 8,497,761 B2 | 7/2013 | Mcneill et al. |
| 8,510,888 B2 | 8/2013 | Eungard |
| 8,528,622 B2 | 9/2013 | Ehrlich |
| 8,547,234 B2 | 10/2013 | Maly et al. |
| 8,590,087 B2 | 11/2013 | Swessel et al. |
| 8,590,674 B2 | 11/2013 | Jette |
| 8,775,710 B1 | 7/2014 | Miller et al. |
| 8,893,764 B2 | 11/2014 | Mascari et al. |
| 8,959,838 B1 | 2/2015 | Marinelli |
| 8,976,006 B2 | 3/2015 | Krupke et al. |
| 8,978,562 B2 | 3/2015 | Nagamine et al. |
| 9,211,889 B1 | 12/2015 | Hoetzer et al. |
| 9,230,419 B2 | 1/2016 | Beggs et al. |
| 9,234,377 B2 | 1/2016 | Schatz et al. |
| 9,283,935 B2 | 3/2016 | Fujioka |
| 9,487,984 B2 | 11/2016 | Wachtell et al. |
| 9,517,902 B2 | 12/2016 | Harrington |
| 9,564,072 B2 | 2/2017 | Senfleben et al. |
| 9,623,859 B2 | 4/2017 | Lavoie et al. |
| 9,633,537 B2 | 4/2017 | Beggs et al. |
| 9,656,691 B2 | 5/2017 | Heimberger et al. |
| 9,751,702 B1 | 9/2017 | Hoofard et al. |
| 9,771,225 B2 | 9/2017 | Stone et al. |
| 9,776,511 B2 | 10/2017 | Brooks et al. |
| 9,777,529 B2 | 10/2017 | Mcneill et al. |
| 9,926,148 B2 | 3/2018 | Hochstein et al. |
| 9,957,121 B2 | 5/2018 | Sveum et al. |
| 10,032,380 B2 | 7/2018 | Mushynski et al. |
| 10,053,904 B2 | 8/2018 | Mcneill et al. |
| 10,081,504 B2 | 9/2018 | Walford et al. |
| 10,096,187 B2 | 10/2018 | Deneen et al. |
| 10,106,342 B2 | 10/2018 | Avalos |
| 10,113,352 B2 | 10/2018 | Mcneill et al. |
| 10,227,190 B2 | 3/2019 | Brooks et al. |
| 10,332,058 B1 | 6/2019 | Kandregula et al. |
| 10,358,858 B2 | 7/2019 | Lietz et al. |
| 10,435,936 B2 | 10/2019 | Lietz et al. |
| 10,444,965 B2 | 10/2019 | Daley et al. |
| 10,494,205 B1 | 12/2019 | Hoofard et al. |
| 10,829,970 B2 | 11/2020 | Ehrlich et al. |
| 10,878,386 B2 | 12/2020 | Hoofard et al. |
| 10,947,069 B2 | 3/2021 | Brooks et al. |
| 11,124,372 B2 | 9/2021 | Hoofard et al. |
| 11,142,413 B2 | 10/2021 | Hoofard et al. |
| 11,225,402 B1 | 1/2022 | Stokes |
| 11,225,824 B2 | 1/2022 | Hoofard et al. |
| 11,262,747 B2 | 3/2022 | Hoofard et al. |
| 11,305,953 B2 | 4/2022 | Hoofard et al. |
| 11,358,813 B2 | 6/2022 | Walford et al. |
| 11,392,141 B2 | 7/2022 | Dinh |
| 11,507,926 B2 | 11/2022 | Hoofard et al. |
| 11,548,743 B2 | 1/2023 | Hoofard et al. |
| 11,668,131 B2 | 6/2023 | Mcneill et al. |
| 11,834,014 B2 | 12/2023 | Yu et al. |
| 11,919,343 B2 | 3/2024 | Mckibben et al. |
| 2001/0035667 A1 | 11/2001 | Gaeta |
| 2002/0089427 A1 | 7/2002 | Aratani et al. |
| 2002/0130065 A1 | 9/2002 | Bloom |
| 2003/0167238 A1 | 9/2003 | Zeif et al. |
| 2004/0146384 A1 | 7/2004 | Whelan |
| 2005/0050438 A1 | 3/2005 | Cheung et al. |

(56) References Cited

U.S. PATENT DOCUMENTS

| | | |
|---|---|---|
| 2005/0102041 A1 | 5/2005 | Duvernell et al. |
| 2005/0102042 A1 | 5/2005 | Reynard et al. |
| 2005/0126081 A1 | 6/2005 | Patel et al. |
| 2005/0261789 A1 | 11/2005 | Chen |
| 2005/0261798 A1 | 11/2005 | Litao |
| 2005/0262549 A1 | 11/2005 | Ritt et al. |
| 2006/0099965 A1 | 5/2006 | Aaron |
| 2006/0119132 A1 | 6/2006 | Rivers et al. |
| 2006/0137261 A1 | 6/2006 | Maly |
| 2006/0181391 A1 | 8/2006 | Mcneill et al. |
| 2006/0235737 A1 | 10/2006 | Fleurant et al. |
| 2006/0289128 A1 | 12/2006 | Ressel et al. |
| 2007/0062422 A1 | 3/2007 | Wotring |
| 2007/0157614 A1 | 7/2007 | Goldman |
| 2007/0256797 A1 | 11/2007 | Orton et al. |
| 2007/0258798 A1 | 11/2007 | Foster et al. |
| 2007/0283806 A1 | 12/2007 | Morrison |
| 2008/0011799 A1 | 1/2008 | Chang |
| 2008/0018438 A1 | 1/2008 | Ehrlich et al. |
| 2008/0022596 A1 | 1/2008 | Boerger et al. |
| 2008/0124203 A1 | 5/2008 | Mcdonald |
| 2008/0127435 A1 | 6/2008 | Maly et al. |
| 2008/0143290 A1 | 6/2008 | Chavakula |
| 2009/0013497 A1 | 1/2009 | Squyres et al. |
| 2009/0024979 A1 | 1/2009 | Chessell et al. |
| 2009/0044191 A1 | 2/2009 | Chai et al. |
| 2009/0093688 A1* | 4/2009 | Mathur .................. H04N 7/18 600/300 |
| 2009/0267744 A1 | 10/2009 | Penot |
| 2010/0073197 A1 | 3/2010 | Eagleton et al. |
| 2010/0146719 A1 | 6/2010 | Swessel et al. |
| 2011/0075441 A1 | 3/2011 | Swessel et al. |
| 2011/0203059 A1 | 8/2011 | Whitley et al. |
| 2011/0301800 A1 | 12/2011 | Furuno et al. |
| 2011/0313893 A1 | 12/2011 | Weik |
| 2012/0025964 A1 | 2/2012 | Beggs et al. |
| 2012/0125545 A1 | 5/2012 | Ehrlich |
| 2012/0304558 A1 | 12/2012 | Iglesias et al. |
| 2013/0024334 A1 | 1/2013 | Kozlay |
| 2013/0038731 A1 | 2/2013 | Brey et al. |
| 2013/0059603 A1 | 3/2013 | Guenec et al. |
| 2013/0117078 A1 | 5/2013 | Weik et al. |
| 2013/0134938 A1 | 5/2013 | Bianco |
| 2013/0188050 A1 | 7/2013 | Winget |
| 2013/0261958 A1 | 10/2013 | Herron |
| 2013/0312205 A1 | 11/2013 | Riviere et al. |
| 2013/0327914 A1 | 12/2013 | Mcneill et al. |
| 2013/0332217 A1 | 12/2013 | Mcneill et al. |
| 2014/0075842 A1 | 3/2014 | Mcneill et al. |
| 2014/0137447 A1 | 5/2014 | Mama |
| 2014/0225509 A1 | 8/2014 | Wiegel et al. |
| 2014/0247347 A1 | 9/2014 | Mcneill et al. |
| 2014/0300457 A1* | 10/2014 | Geerlings ................ B60Q 1/00 340/438 |
| 2015/0009046 A1 | 1/2015 | Senfleben et al. |
| 2015/0013083 A1 | 1/2015 | Palmersheim |
| 2015/0039552 A1 | 2/2015 | Moyne |
| 2015/0047132 A1 | 2/2015 | Sveum et al. |
| 2015/0047133 A1 | 2/2015 | Sveum |
| 2016/0031482 A1 | 2/2016 | Lavoie |
| 2016/0075526 A1 | 3/2016 | Avalos |
| 2016/0090072 A1 | 3/2016 | Eppley et al. |
| 2016/0104364 A1 | 4/2016 | Brooks et al. |
| 2016/0178382 A1 | 6/2016 | Penna et al. |
| 2016/0288833 A1 | 10/2016 | Heimberger et al. |
| 2016/0362135 A1 | 12/2016 | Xu et al. |
| 2016/0368489 A1 | 12/2016 | Aich et al. |
| 2017/0008498 A1 | 1/2017 | Garrow et al. |
| 2017/0017392 A1 | 1/2017 | Castaneda et al. |
| 2017/0043967 A1 | 2/2017 | Walford et al. |
| 2017/0044817 A1 | 2/2017 | McNeill et al. |
| 2017/0073005 A1 | 3/2017 | Jawad et al. |
| 2017/0106794 A1 | 4/2017 | Constantine |
| 2017/0168501 A1 | 6/2017 | Aoki et al. |
| 2017/0174209 A1 | 6/2017 | Lavoie |
| 2017/0205824 A1 | 7/2017 | Nordbruch et al. |
| 2017/0213404 A1 | 7/2017 | Sivalingam et al. |
| 2017/0320685 A1 | 11/2017 | Hoofard et al. |
| 2018/0035606 A1 | 2/2018 | Burdoucci |
| 2018/0278897 A1 | 9/2018 | Seaman et al. |
| 2019/0002216 A1 | 1/2019 | Walford et al. |
| 2019/0064835 A1 | 2/2019 | Hoofard et al. |
| 2019/0144218 A1 | 5/2019 | Hoofard et al. |
| 2019/0197318 A1 | 6/2019 | Krishnamurthy et al. |
| 2019/0202646 A1 | 7/2019 | Brooks et al. |
| 2019/0301224 A1 | 10/2019 | Barton |
| 2019/0302764 A1 | 10/2019 | Smith et al. |
| 2019/0316403 A1 | 10/2019 | Aiello |
| 2019/0392402 A1 | 12/2019 | Vandergon et al. |
| 2020/0002993 A1 | 1/2020 | Thouin |
| 2020/0018110 A1 | 1/2020 | Lindley et al. |
| 2020/0087970 A1 | 3/2020 | Nielson et al. |
| 2020/0115948 A1 | 4/2020 | Lietz et al. |
| 2020/0125074 A1 | 4/2020 | Ramos et al. |
| 2020/0133259 A1 | 4/2020 | Van Wiemeersch et al. |
| 2020/0180881 A1 | 6/2020 | Hoofard et al. |
| 2020/0273133 A1 | 8/2020 | Morris |
| 2020/0334631 A1 | 10/2020 | Conlon |
| 2020/0361326 A1 | 11/2020 | Krucinski et al. |
| 2020/0393828 A1 | 12/2020 | Hoofard et al. |
| 2021/0079710 A1 | 3/2021 | Evans et al. |
| 2021/0082220 A1 | 3/2021 | Boerger et al. |
| 2021/0238908 A1 | 8/2021 | Ramage et al. |
| 2022/0146269 A1 | 5/2022 | Hoofard et al. |
| 2022/0170311 A1 | 6/2022 | Mcneill et al. |
| 2022/0243524 A1 | 8/2022 | Hoofard et al. |
| 2022/0306410 A1 | 9/2022 | Hoofard et al. |
| 2022/0338719 A1 | 10/2022 | Walford et al. |
| 2022/0349715 A1 | 11/2022 | Park |
| 2022/0388380 A1 | 12/2022 | Hoofard et al. |
| 2023/0003074 A1 | 1/2023 | Hoofard et al. |
| 2024/0051521 A1 | 2/2024 | James et al. |

FOREIGN PATENT DOCUMENTS

| | | |
|---|---|---|
| DE | 202005008059 U1 | 11/2005 |
| DE | 102004037933 B3 | 2/2006 |
| EP | 2215612 B1 | 8/2012 |
| EP | 2660170 A1 | 11/2013 |
| FR | 2797246 A1 | 2/2001 |
| FR | 2869470 A1 | 10/2005 |
| WO | 2005045169 A1 | 5/2005 |
| WO | 2006066013 A2 | 6/2006 |
| WO | 2006076538 A2 | 7/2006 |
| WO | 2008014026 A1 | 1/2008 |
| WO | 2008014206 A1 | 1/2008 |
| WO | 2008036087 A1 | 3/2008 |
| WO | 2009070509 A1 | 6/2009 |
| WO | 2010077977 A1 | 7/2010 |
| WO | 2011037839 A1 | 3/2011 |
| WO | 2015023666 A1 | 2/2015 |
| WO | 2015023669 A1 | 2/2015 |
| WO | 2015084167 A1 | 6/2015 |
| WO | 2015166339 A1 | 11/2015 |
| WO | 2016007321 | 1/2016 |
| WO | 2016209141 A1 | 12/2016 |
| WO | 2017100716 A1 | 6/2017 |
| WO | 2019090199 A1 | 5/2019 |
| WO | 2019173811 A2 | 9/2019 |
| WO | 2019209773 A1 | 10/2019 |

OTHER PUBLICATIONS

Pentalift introduces industry's first solar powered dock leveler! www.pentalift.com, Jun. 14, 2011, page.

APS&GO—LED Communication System Specification Sheet, APS Resource, for APS1102, Nov. 2009, 2 pages.

Bin et al., Constrained Model Predictive Control for Backing-up Tractor-Trailer System, Proceeding of the 10th World Congress on Intelligent Control and Automation, Jul. 6-8, 2012, Beijing, China, pp. 2165-2170.

(56) References Cited

OTHER PUBLICATIONS

Desantis et al., Path-Tracking for Tractor-Trailers with Hitching of Both the On-Axle and the Off-Axle Kind, Proceedings of the 2002 IEEE International Symposium on Intelligent Control, 2002.
Energy Saving Products Brochure, APS Resource, Mar. 2009, 4 pages.
FT Ultra LED Flex Arm Docklight Specification Sheet, APS Resource, Form APS 1168, Nov. 2009, 2 pages.
Fuchs C et al: "3D pose estimation for articulated vehicles using Kalman-filter based tracking", Pattern Ricognition. Image Analysis, Allen Press, Lawrence, KS, US, vol. 26, No. 1, Jul. 23, 2016 (Jul. 23, 2016), pp. 109-113.
High Impact LED Dock Light Specification Sheet, APS Resource, Form APS1171, Nov. 2009, 2 pages.
Kelley Company; Vehicle Restraints brochure; 2008 ; 8 pages.
Manual and Automatic Light Communication Systems, User's Manual, Serco, Oct. 2009, 28 pages.
McGovern et al., An Articulated Truck on a Spreadsheet, Level 3, Issue 1, Nov. 2003, 23 pages.
Model G307K2 Kadet 2 Operator Interface with 7" TFT Display, Red Lion Controls, Inc., Nov. 23, 2015, 4 pages.
Oreh et al., A New Method for Directional Control of a Tractor Semi-Trailer, Australian Journal of Basic and Applied Sciences, 6(12): 369-409, 2012.
Rite-Hite Corporation, Rite-Vu Light Communication Systems Brochure, 6 pages [Not dated].
Safety & Lighting Products Brochure, APS Resource, Sep. 2004, 2 pages.
Serco Vehicle Restraints brochure; 2008; 4 pages.
Serco; Loading Dock Solutions brochure; 2008; 8 pages.
Smart Power Systems International GmbH, Web pages for Hybrid DC/AC Power Supply, Jun. 1, 2004.
Tofael Ahamed: "Navigation of an Autonomous Tractor Using Multiple Sensors", Thesis, Feb. 22, 2008 (Feb. 22, 2008), XP055527539, retrieved from the Internet: URL: https ://tsukuba.repo.nii.ac.jp, [retrieved on Nov. 27, 2018], Chapter 9.
Hamid et al. "Implementation of Intelligent Automated Gate System with QR Code," International Journal of Advanced Computer Science and Applications 9. 10 (2018) (Year: 2018); 6 pages.
Office Action in Canadian Application No. 3,067,610; Date of Mailing Apr. 18, 2024; 4 pages.
Office Action in Mexican Application No. MX/a/2020/000381; Date of Mailing: Mar. 22, 2024; 7 pages.

\* cited by examiner

CONTROL SYSTEMS FOR OPERATION OF LOADING DOCK EQUIPMENT, AND ASSOCIATED METHODS OF MANUFACTURE AND USE

CROSS-REFERENCE TO RELATED APPLICATIONS

This application is a continuation of U.S. patent application Ser. No. 17/693,997, which is a continuation of U.S. patent application Ser. No. 16/245,172, filed Jan. 10, 2019, now U.S. Pat. No. 11,305,953, which is a continuation-in-part of U.S. patent application Ser. No. 15/145,605, filed May 3, 2016, now U.S. Pat. No. 11,225,824, the disclosures of which are incorporated herein by reference in their entireties.

TECHNICAL FIELD

The following disclosure relates generally to systems and methods for controlling the operation of loading dock equipment and, more particularly, to control panels for operating loading dock equipment.

BACKGROUND

Conventional loading docks typically include an elevated opening covered by an overhead door in the side of a warehouse or other building. To unload or load a trailer or other transport vehicle, the doors on the back of the vehicle are opened and the vehicle is backed up to the loading dock door. A vehicle restraint (e.g., a mechanical hook, wheel chock, etc.) is employed to hold the vehicle in position in front of the loading dock door. The loading dock door is then raised, and a dock leveler is extended between the floor of the warehouse and the open end of the vehicle. Conventional dock levelers typically include a deck that rotates into position as a lip on the front edge of the deck extends outwardly and comes to rest on the bed of the vehicle. Once the dock leveler has been properly positioned, workers, forklifts, etc. can move back and forth over the dock leveler to unload and/or load goods and materials to and from the vehicle. Once the unloading and/or loading process is complete, the dock leveler can be raised and stowed, and the loading dock door can be closed. The vehicle restraint is then disengaged from the vehicle so that the vehicle can pull away from the loading dock.

Loading dock equipment is typically controlled via a control panel positioned adjacent to the loading dock door inside the building. Conventional control panels typically include mechanical or pressure membrane controls that enable dock operators to control operation of the various pieces of loading dock equipment described above, and they can also include indicator lights to communicate equipment status. The controls and indicator lights are typically arranged on the face of the control panel in a logical manner and present the operator with a variety of choices and decisions to determine the particular operation he or she wants to perform. Examples of existing control panels are disclosed in U.S. Pat. No. 6,975,226, which is incorporated herein in its entirety by reference.

By way of example, FIG. 1 is a front view of a loading dock control panel 100 configured in accordance with the prior art. The control panel 100 includes a vehicle restraint engage button 102a and a corresponding vehicle restraint release button 102b, as well as a restraint override selector knob 104. The control panel 100 also includes a series of indicator lights 120a-c (which may be referred to as operator signal lights) that can be illuminated in red, amber and green, respectively, to indicate status of the vehicle restraint in a known manner. The control panel 100 further includes a shelter selector knob 106 that enables the dock operator to inflate or deflate the dock shelter, and a loading light selector knob 116 that enables the operator to turn the dock lights on and off. Additionally, the control panel 100 includes a door open button 108a, a corresponding door close button 108b, and a door stop button 110 that enables the operator to open, close, and stop the loading dock door, respectively, as desired. The control panel 100 also includes controls for operating a dock leveler and a safety gate. More specifically, the control panel 100 includes a safety gate selector knob 118 for raising and lowering the safety gate, a dock leveler raise button 112 and a corresponding lip extend button 114. The control panel 100 can additionally include an air curtain selector knob 124 for controlling operation of an air curtain positioned over the dock opening, and a guide light selector knob 126 to turn on/off guide lights mounted outside the dock to assist vehicle operators when parking transport vehicles at the dock. In addition to the foregoing features, the control panel 100 also includes an emergency stop button 122. The operator can depress the emergency stop button 122 at any time to immediately stop operation of the dock equipment.

As described above, conventional control panels can include a large number of operational choices for the dock operator. This can lead to operator confusion regarding which controls to actuate at any given time, which in turn can lead to operator errors and delays. One way to address this with conventional control panels is to interlock the various pieces of loading dock equipment, so that only certain operations can be performed at particular points in the loading dock sequence. For example, the panel 100 can be configured to require the sequential operation of the loading dock equipment as follows: First, the vehicle restraint is engaged, which must occur before the dock shelter is inflated, which must occur before the dock door is opened, which must occur before the dock leveler is moved into position in the vehicle, which must occur before the dock light is turned on. Even with interlocked control panels, however, the dock operator may waste a significant amount of time trying to actuate the wrong controls or trying to determine which controls should be actuated. In other control panels, it is possible to completely automate the control process so that the operator only has to depress one button to initiate the sequence of operations outlined above. Alternatively, the loading dock sequence can begin automatically when a certain condition occurs (e.g., once the vehicle restraint is properly engaged with the vehicle). These types of control panels, however, do not allow any flexibility in the operational sequence and must be designed at the outset for use with a particular loading dock configuration.

Accordingly, it would be advantageous to provide control panels for loading dock equipment that overcome the shortcomings of conventional panels and simplify the operation of loading dock equipment.

DETAILED DESCRIPTION

Figure 1:
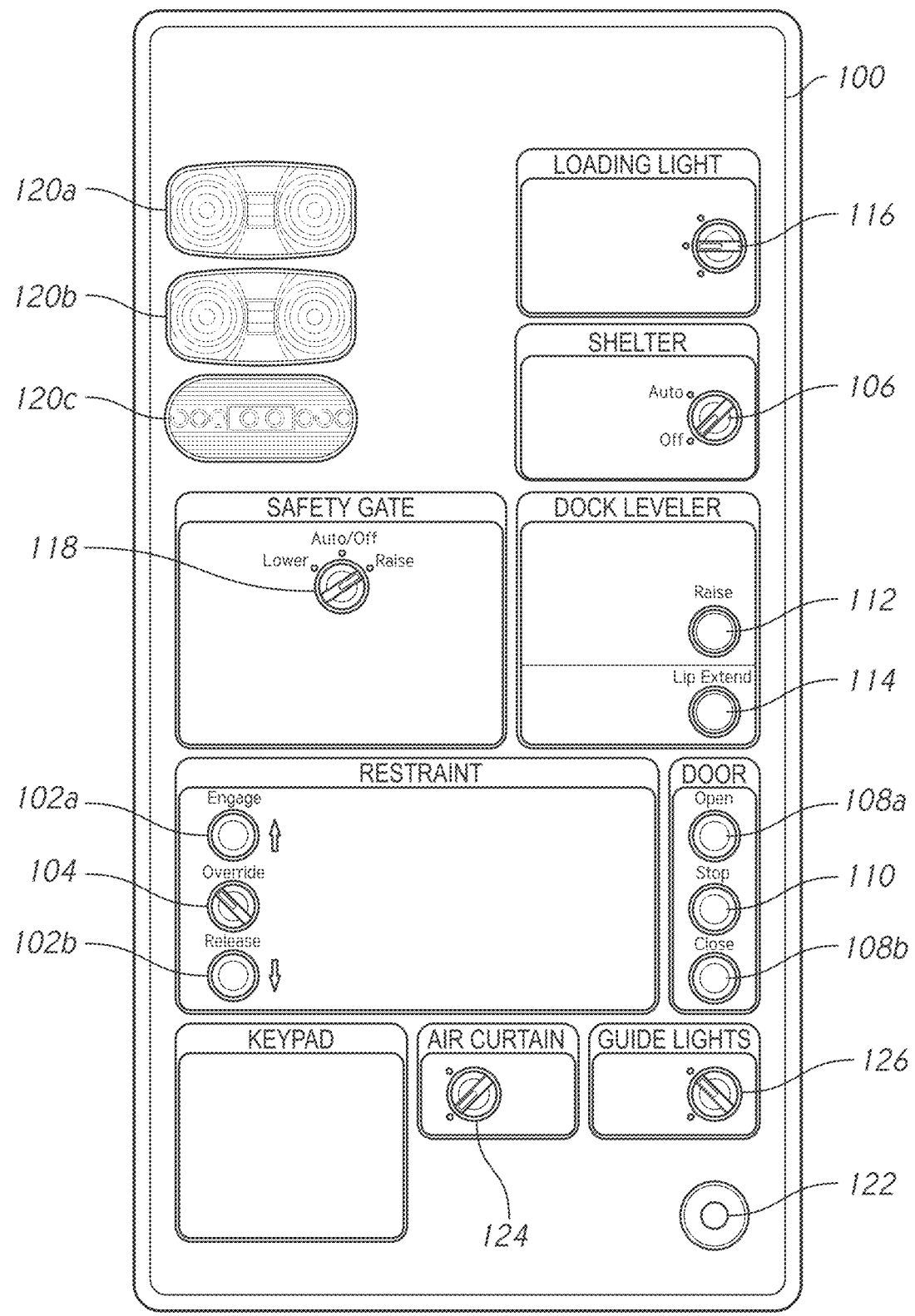
FIG. 1 is a front view of a loading dock control panel configured in accordance with the prior art.

The following disclosure describes various embodiments of systems and methods for controlling the operation of loading dock equipment. The systems can include a loading dock control panel ("control panel") having a touchscreen interface configured to receive operator inputs for controlling operation of loading dock equipment. More specifically, in some embodiments the touchscreen is configured so that it only presents the dock operator with operational choices that are appropriate to accomplish a preset sequence of operation of the loading dock equipment and that are available at a current authorization level.

As described in greater detail below, the control panel can be configured to present the operator with a sequence of control elements. Control elements can be displayable elements such as buttons, icons, textual prompts, or entire display screens. In some embodiments, a "normal operation" sequence can first present a control element to the operator for operating the vehicle restraint, while controls for the other pieces of loading dock equipment are either not present and/or are identified by visual representation to be inoperative. After the vehicle restraint has been properly engaged and, for example, the inflatable shelter has been properly inflated, the touchscreen can display control elements that enable the operator to raise the dock door, while not displaying functional control elements for the other pieces of loading dock equipment. Similarly, after the dock door has been raised, the touchscreen can then display only control elements for installing the dock leveler in the shipping vehicle. Embodiments of the present technology can also provide flexibility by allowing the dock operator to stop or reverse the dock sequence at any point.

The control panel can be further configured to identify an authorization level for a current user, e.g., based on an authorization code. Functionality available through the control panel can be enabled or disabled according to the authorization level. For example, at a first level of authorization, only the normal operation sequence is available to the current user. At a second level of authorization, other operations are available such as skipping use of the vehicle restraint by instead indicating use of a wheel chock, manually operating the door or other equipment, selecting other dock equipment to operate, etc. At a third level of authorization, additional controls and system checks can be available, such as accessing control panel settings, internal state, usage statistics, maintenance reports and automated maintenance, alerts, and event logs. At a fourth level of authorization, administrator access can be grated, e.g., to upgrade control panel software or access debugging controls. In some embodiments, the levels of authorization can be established differently, such as levels of authorization can be merged or further segmented. For example, the second and third levels of authorization can be merged or the third level of authorization can be split into additional levels. In some embodiments, the level of authorization can be increased or decreased during operation of the control panel. For example, a user can establish the first level of authorization by entering a first code when beginning use of the control panel. Upon determining that the vehicle restraint cannot be engaged, the user (or another user either locally or remotely) can enter a second code to upgrade the level of authorization to the second level.

In some embodiments, the sequence of control elements that the control panel presents to the operator can include different sub-sequences based on loading dock conditions. For example, loading dock conditions can include the user's current level of authorization, loading dock equipment configuration, various loading dock sensor inputs, user specified conditions, or external controls. Depending on what conditions are identified, the control panel can select a next sub-sequence to present in operation of the control panel. For example, the control panel can provide control elements in the normal operation sequence unless a condition is identified indicating that a vehicle restraint failed to engage. In response, the control panel can provide an "alternate restraint" sub-sequence that provides a control element signaling the user to engage an alternate restraint for the vehicle, to upgrade the current authorization level, and confirm the alternate restraint is properly engaged.

Accordingly, touchscreens configured in accordance with the present technology can be configured so that the dock operator can easily follow a sequence of loading dock equipment operations in which only one set of equipment controls are displayed on the screen at any given time. In some embodiments, the selection of equipment controls presented can be based on a current authorization level and/or identified loading dock conditions. By displaying controls in sequence for operation of only a piece (or pieces) of loading dock equipment at any particular time, providing intelligent sub-sequences according to loading dock conditions, and enabling and disabling control panel functionality based on authorization levels, the touchscreen control panels described herein reduce confusion, increase security, simplify the operation and status of loading dock equipment, increase reliability, save time, and reduce the likelihood of operational errors.

Certain details are set forth in the following description and in FIGS. 1-14 to provide a thorough understanding of various embodiments of the present technology. In other instances, well-known structures, materials, operations and/or systems often associated with loading dock equipment, loading dock control panels, computer displays, touchscreens, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. Component details may be abstracted in the Figures to exclude details such as the position of components and certain precise connections between such components when such details are unnecessary for a complete understanding of how to make and use the invention. The sizes of various depicted elements are not necessarily drawn to scale, and these elements may be arbitrarily enlarged to improve legibility. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. Those of ordinary skill in the art will appreciate that further embodiments of the invention can be practiced without several of the details described below.

In general, identical reference numbers in the Figures identify identical, or at least generally similar, elements. To facilitate the discussion of any particular element, the most significant digit or digits of any reference number refers to the Figure in which that element is first introduced. For example, element 210 is first introduced and described with reference to FIG. 2.

Figure 2A:
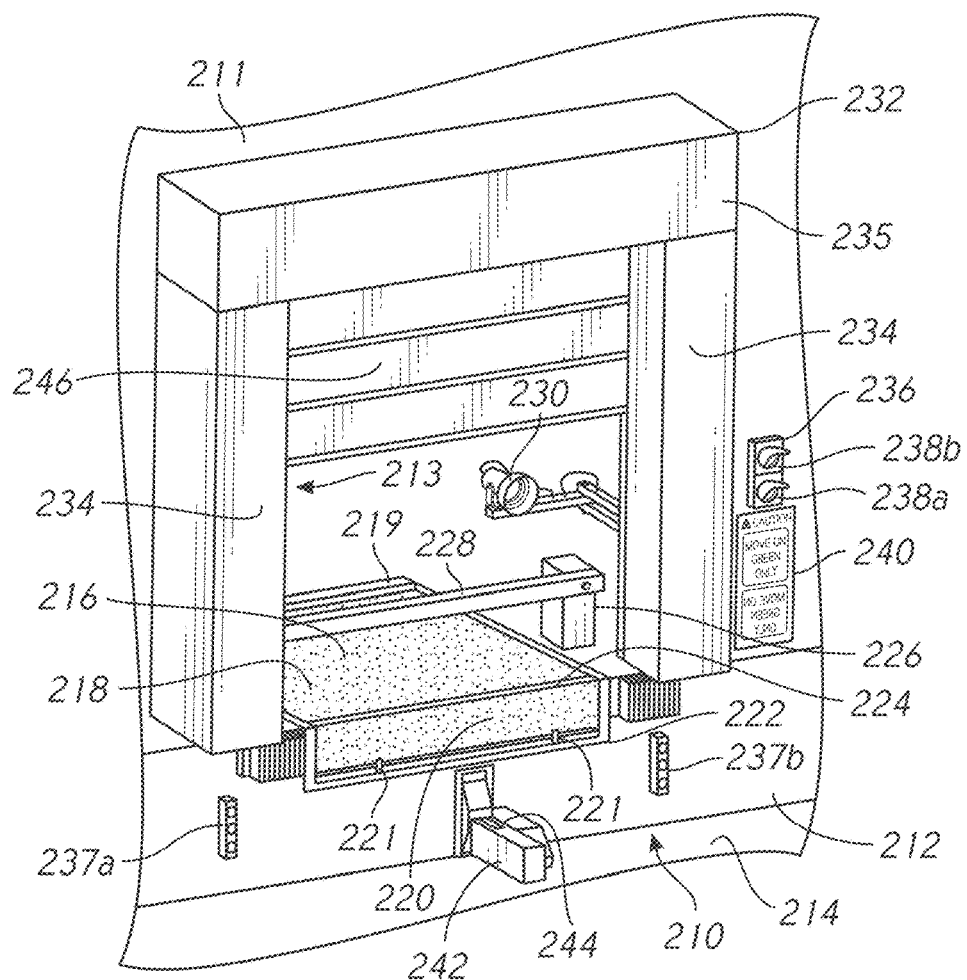
FIG. 2A is an exterior isometric view of a loading dock having a loading dock control panel configured in accordance with an embodiment of the present technology.
Figure 2B:
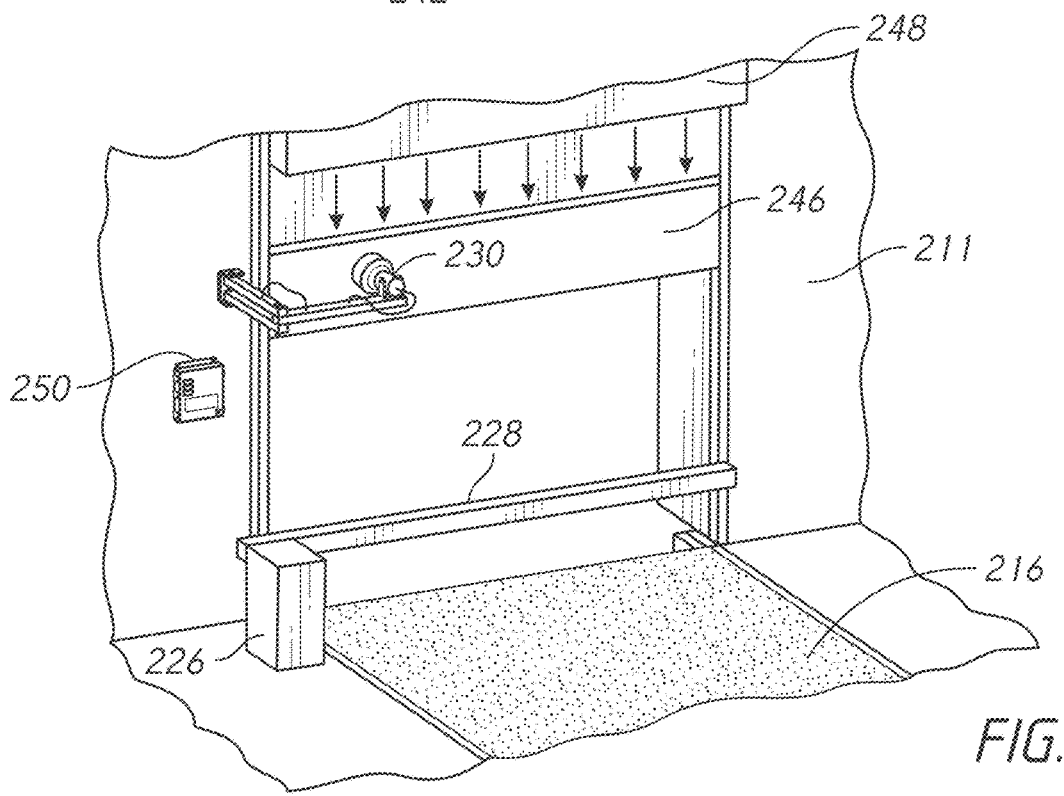
FIG. 2B is an interior isometric view of the loading dock of FIG. 2A.

FIGS. 2A and 2B are exterior and interior isometric views, respectively, of a loading dock 210 having a control panel 250 configured in accordance with an embodiment of the present technology. Referring to FIGS. 2A and 2B together, in the illustrated embodiment the loading dock 210 includes a driveway 214 in front of an elevated opening 213 in a warehouse or other building 211. The opening 213 can include a barrier gate 226 positioned directly behind a door 246 (e.g., a powered roll-up or overhead door), which is shown partially open. The barrier gate 226 includes a barrier arm 228 that can be electrically operated to rotate from a horizontal, blocking position as shown to a vertical, open position in a known manner. A vehicle restraint 242 (e.g., an electrically-actuated mechanical restraint) is mounted to, or near, a dock face 212 and includes a movable hook 244. The hook 244 can be raised to engage a rear impact guard ("RIG") of a truck or tractor trailer (not shown) to secure the vehicle at the loading dock 210 in a known manner and prevent, for example, inadvertent "early departure" and/or "trailer creep" away from the dock face 212 during the loading or unloading process. After loading/unloading, the hook 244 can be lowered or otherwise retracted to release the vehicle.

In the illustrated embodiment, the loading dock 210 further includes a dock shelter 232. The dock shelter 232 can include inflatable side members 234 extending vertically along each side of the opening 213, and an inflatable head member 235 extending horizontally across the top of the opening 213. Prior to use, the side members 234 and the head member 235 can be at least partially deflated. After a trailer backs into the loading dock 210 and is engaged by the vehicle restraint 242, the side members 234 and the head member 235 can be inflated (via, e.g., an electrically-driven air pump) to form an environmental seal between the trailer and the dock wall in a known manner. In other embodiments, the loading dock 210 can include other types of dock seals (e.g., compressible foam seals) in place of, or in addition to, the dock shelter 232, or a dock shelter can be omitted.

The loading dock 210 also includes a dock leveler 216 (e.g., a hydraulic dock leveler) positioned adjacent to the opening 213. The dock leveler 216 includes a deck 218 pivotally attached to a frame 219 at the rear of a pit 222 formed in the floor of the building 211. A lip 220 is pivotally attached to a forward edge portion of the deck 218 via one or more hinges 224. In the stored position shown, the outer edge portion of the lip 220 is supported by keepers 221 mounted at the front of the pit 222 near the dock face 212. In operation, the deck 218 first rotates upwardly away from the pit 222, and then downwardly as the lip 220 rotates outward and eventually comes to rest on the bed of a truck or trailer (not shown) parked at the loading dock 210. Once installed, the deck 218 and the lip 220 provide a ramp for dock workers, fork lifts, etc. to move back and forth and transfer goods, materials, etc. into and/or out of the vehicle. A dock light 230 can be movably mounted to an interior wall of the building 211 to one side of the opening 213 to illuminate the interior of the vehicle during the loading and/or unloading process. Additionally, an air curtain 248 (having, e.g., an electrically-driven blower fan) can be positioned above the opening 213 and configured to direct a "curtain" of air downwardly across the opening 213 to prevent air and/or contaminants from flowing between the building 211 and the vehicle when the dock door 246 is open.

As shown in FIG. 2A, a signal light assembly 236 can be mounted to the building 211 adjacent the opening 213 to provide visual signals to vehicle drivers. For example, the signal assembly 236 can include a green light 238a that, when illuminated, indicates to a vehicle driver that it is safe to back a trailer up to the loading dock 210. Or, if the vehicle is already at the loading dock 210, the green light 238a indicates that the vehicle restraint 242 has been disengaged from the trailer and it is safe to move the vehicle away from the loading dock 210. The light assembly 236 can also include a red light 238b that, when illuminated, indicates to a vehicle driver that the restraint 242 is engaged with the trailer and it is therefore not safe to move the vehicle away from the loading dock 210. In some embodiments, instead of the arrangement of the round green light 238a positioned vertically with the round red light 238b (as shown in FIG. 2A), the signal light assembly can include the green light 238a as an O shape while the red light 238b can have an X shape. In various embodiments, the green light 238a with the O shape can overlap with the red light 238b (similarly to the configuration of lights 358c and 358a described below in relation to FIG. 3B) or can be non-overlapping such as in a vertical arrangement. Instructions indicating the meaning of the signal lights in signal light assembly 236 can be posted in writing on a sign 240 positioned adjacent to the signal light assembly 236. In addition to the signal lights 238a and 238b, in some embodiments the loading dock 210 can also include a first guide light 237a mounted to the dock face 212 on one side of the opening 213, and a second guide light 237b mounted to the dock face 212 on the opposite side of the opening 213. The guide lights 237a and 237b are positioned so that they can be illuminated and easily viewed by vehicle drivers with rear view mirrors to help them align their trailers with the opening 213 as they back the trailers up to the loading dock 210.

The various pieces of loading dock equipment and associated systems described above (e.g., the vehicle restraint 242, the light assembly 236, the dock shelter 232, the door 246, the loading light 230, the air curtain 248, the dock leveler 216 and the barrier gate 226) can be at least generally similar in structure and function to conventional loading dock equipment well known in the art. For example, the loading dock equipment described above can be at least generally similar in structure and function to loading dock equipment described in: U.S. Pat. Nos. 8,893,764; 8,510,888; 8,490,669; 8,407,842; 8,307,589; 8,181,401; 8,112,949; 7,165,486; 7,119,673; 6,082,952; and 5,831,540; U.S. Provisional Application No. 61/988,081, filed May 2, 2014, and titled SYSTEMS AND METHODS FOR AUTOMATICALLY CONTROLLING LOADING DOCK EQUIPMENT; and PCT Application No. PCT/IB2015/000698, filed Apr. 30, 2015, and titled SYSTEMS AND METHODS FOR AUTOMATICALLY CONTROLLING LOADING DOCK EQUIPMENT; each of which is incorporated herein in its entirety by reference.

As shown in FIG. 2B, in the illustrated embodiment the control panel 250 is mounted to an interior wall of the building 211 to one side of the dock door 246 at about eye level. The control panel 250 is operably connected (via, e.g., wired or wireless connections) to the loading dock equipment described above. As described in greater detail below, the control panel 250 includes an "intelligent" graphical user interface (that can include, e.g., a touchscreen) that enables the dock operator to quickly and easily operate the loading dock equipment to safely engage a truck or trailer for unloading and/or loading, and then safely release the vehicle and secure the dock area after the unloading/loading process.

Figure 3A:
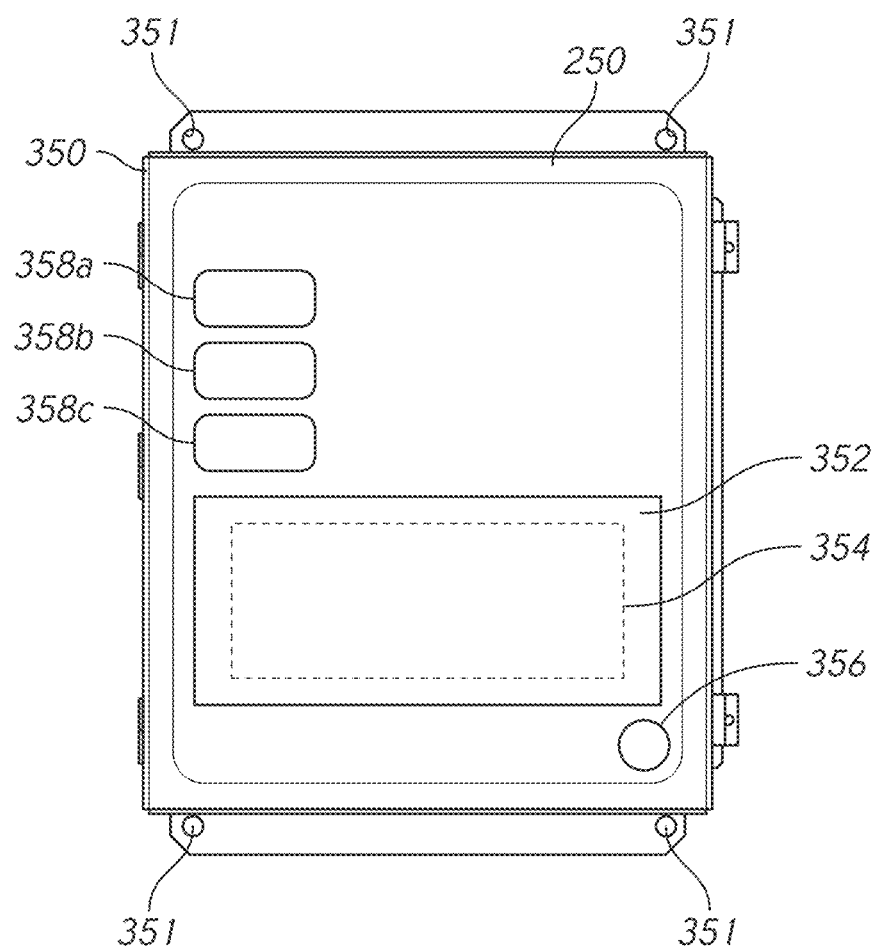
FIG. 3A is a front view of a loading dock control panel configured in accordance with an embodiment of the present technology and FIG. 3B is a front view of another loading dock control panel configured in accordance with another embodiment of the present technology.

FIG. 3A is an enlarged front view of one embodiment of the control panel 250 configured in accordance with an embodiment of the present technology. In the illustrated embodiment, the control panel 250 can be formed in the shape of a generally rectangular housing 350 that can accommodate the electrical, mechanical, and processing components associated with the control panel 250. The housing 350 can include a plurality of mounting holes 351 for fastening or otherwise attaching the control panel 250 to a wall or other suitable location proximate the loading dock 210.

The control panel 250 includes a display screen 352 that can present a series of graphical user interfaces (GUI's) for control of loading dock equipment. More specifically, in the illustrated embodiment the display screen 352 includes a touchscreen portion ("touchscreen 354") that displays graphical and/or textual symbols, characters and/or other elements that facilitate user operation of the control panel 250. In other embodiments, the touchscreen 354 can encompass the entire display screen 352. The touchscreen 354 can be any suitable electronically-displayed, touch-sensitive user input device known in the art, including, for example, a touchscreen utilizing resistive or capacitive technologies. As is known, capacitive touchscreens operate by sensing the electrical properties of a human touch, while resistive touchscreens operate by sensing direct pressure applied by the user. The display screen 352 can be, for example, an LCD or an LED display. In other embodiments, the touchscreen 354 and/or the display screen 352 can include other known user input and/or visual display technologies without departing from the present disclosure. For example, in other embodiments the touchscreen 354 can utilize acoustic, infrared, and/or other touchscreen technologies, and the display screen 352 can be an ELD, an OLED, and/or other electronic display device known in the art.

In addition to the touchscreen 354, the control panel 250 further includes a series of indicator lights 358a-358c. In the illustrated embodiment, the indicator lights 358a-358c have red, amber and green colored lenses, respectively, and project the corresponding colors as visual signals that indicate the status of the vehicle restraint 242 (FIG. 2A). More specifically, if the red light 358a is illuminated, this indicates that the vehicle restraint 242 is not engaged with a vehicle parked at the loading dock 210, and thus it is not safe to open the dock door 246 and/or otherwise attempt to cross the loading dock threshold into the vehicle at this time. If the amber light 358b is illuminated, this indicates to the dock operator that the vehicle restraint 242 is in an override mode, and thus after the operator has confirmed that the vehicle's wheels have been chocked or the vehicle has otherwise been suitably restrained at the loading dock, the operator can proceed with unloading and/or loading with due caution. If the green light 358c is illuminated, this indicates that the vehicle restraint 242 has been properly engaged with the vehicle and the unloading and/or loading process can safely proceed. In addition to the foregoing features, the control panel 250 also includes an emergency stop button 356. The emergency or "E-stop" button 356 can be depressed by the operator at any time to immediately stop operation of any loading dock equipment that happens to be in motion at that time.

In the illustrated embodiment, the control panel 250 is mounted to the front of a generally rectangular housing 350 that can accommodate the electrical, mechanical, and processing components associated with the control panel 250. The housing 350 can include a plurality of mounting holes 351 for fastening or otherwise attaching the control panel 250 to a wall or other suitable location proximate the loading dock 210.

Figure 3B:
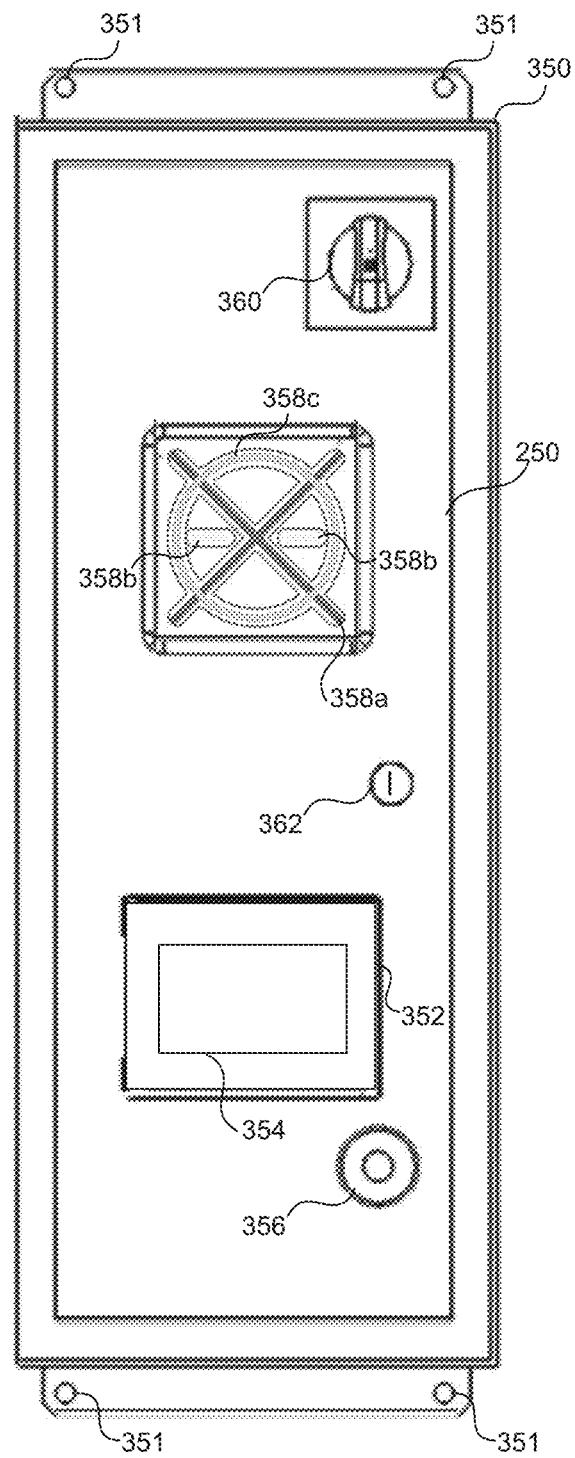

FIG. 3B is an enlarged front view of a second embodiment of the control panel 250 configured in accordance with an embodiment of the present technology. The elements 350-358 are configured as described above in relation to FIG. 3A. In FIG. 3B, red light 358a is shaped as an X, the amber light 358b as two horizontal dashes, and the green light 358c is shaped as an circle. The second embodiment of the control panel 250 includes an on/off switch 360 for the control panel and a key slot 362 which locks the face of the control panel to the housing 350 and, when unlocked, provides access to the internal components of the control panel 250.

Figure 4:
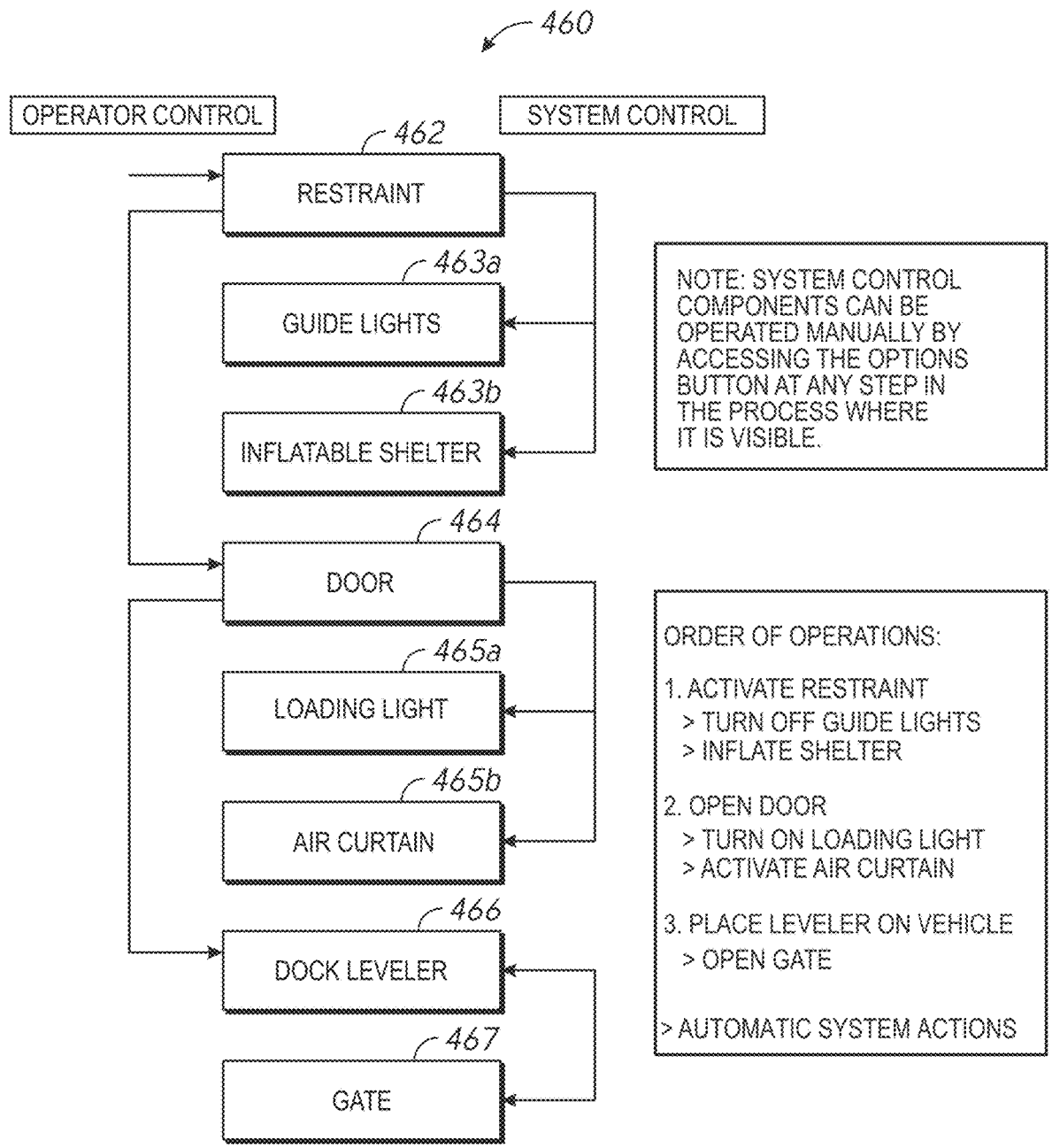
FIG. 4 is a flow diagram of a routine for operating a loading dock control panel configured in accordance with an embodiment of the present technology.

FIG. 4 is a flow diagram of a normal operational sequence 460 that can be implemented by the control panel 250 in accordance with an embodiment of the present technology. More specifically, as noted above, the touchscreen 354 (FIGS. 3A and 3B) can be configured to sequentially display a series of graphical control elements that only enable the operator to control an appropriate piece of loading dock equipment at any given time, while at the same time either not displaying (or displaying in a way that indicates inoperability) graphical control elements associated with other pieces of loading dock equipment that are interlocked to prevent operation out of sequence. By only displaying appropriate options at any given time, the control panel 250 reduces the possibility of the operator being confused about which piece of loading dock equipment should be operated next, and enables the operator to quickly execute the appropriate sequence of dock equipment operations.

In FIG. 4, operator control inputs (i.e., operator inputs to the control panel 250) are illustrated by the arrows on the left side of the operational sequence 460, and system control inputs (i.e., automatic control inputs provided by the control panel 250) are illustrated by the arrows on the right side of the operational sequence 460. In the illustrated embodiment, the operational sequence 460 begins in block 462 with the touchscreen 354 displaying graphical control elements for operation of the vehicle restraint 242 (FIG. 2A), while not providing control elements for operation of the other loading dock equipment, such as the door 246 or the dock leveler 216. Additionally, in some embodiments the touchscreen 354 can also display an "options" button that enables the operator to manually control a particular piece of loading dock equipment or component. Thus, at the beginning of the sequence the operator's only option is to select (e.g., touch) a graphical control element (e.g., a button) for control of the vehicle restraint 242, or to select an "options" button. For example, as described in greater detail below, the operator may select an "engage" button displayed by the touchscreen 354 to cause the vehicle restraint 242 to engage a trailer parked at the loading dock 210. Assuming that the guide lights 237a and 237b (FIG. 2A) were illuminated to aid the driver in parking the vehicle, after the vehicle has been properly restrained the controller 250 can automatically turn off the guide lights 237a and 237b as noted by block 463a. Additionally, the controller 250 can send a command to the air pump or other appropriate hardware to inflate the dock shelter 232, as illustrated by block 463b.

Once the vehicle restraint 242 has been properly engaged, the guide lights 237a and 237b have been turned off, and the dock shelter 232 has been inflated, the touchscreen 354 displays one or more graphical control elements that only permit operation of the loading dock door 246, as illustrated by block 464. Once the operator has selected the appropriate button (e.g., a door "raise" button) to raise the dock door 246, the control panel 250 can automatically command the loading light 230 to turn on, as illustrated by block 465a, and can also activate the air curtain 248 (FIG. 2B), as illustrated by block 465b. Once the dock door 246 has been fully raised and the loading light 230 and the air curtain 248 have been turned on, the touchscreen 354 can display one or more graphical control elements that only enable the operator to control the dock leveler 216, as illustrated by block 466. More specifically, as described in greater detail below, the touchscreen 354 can display graphical control elements (e.g., buttons) for raising the dock leveler 216 and then lowering it to extend the lip 220 onto the bed of the open trailer. Once the dock leveler 216 has been correctly installed in the vehicle, the control panel 250 sends a command to the barrier gate 226 causing it to automatically raise the barrier arm 228, as illustrated by block 467. After the sequence of operations 460 is complete, dock personnel can begin unloading and/or loading the vehicle from the loading dock 210.

Once the unloading and/or loading process is complete, the touchscreen 354 can display a series of graphical control elements that only enable the sequential control of the loading dock equipment in an appropriate manner to release the vehicle and safely secure the loading dock 210. This operational sequence is essentially the reverse of the sequence 460 illustrated in FIG. 4. For example, releasing the vehicle and securing the loading dock 210 can include first enabling the operator to store the dock leveler 216, after which the controller 250 automatically lowers the barrier gate arm 228. Next, the touchscreen 354 can display graphical control elements that enable the operator to close the dock door 246, while interlocking the other loading dock equipment to prevent inadvertent operation in a way that might be unsafe or damage the equipment. Once the dock door 246 has been fully closed, the control panel 250 can automatically turn off the loading light 230 and the air curtain 248. Next, the touchscreen 354 can display one or more graphical control elements that only enable operation of the vehicle restraint 242, and the operator can select the appropriate control element or elements to disengage the vehicle restraint 242 from the vehicle. Once the vehicle has been properly disengaged, the control panel 250 can automatically deflate the dock shelter 232 and, if necessary, turn on the guide lights 237a and 237b for the next trailer.

FIG. 4 is a representative flow diagram that depicts a normal operation sequence processes used in some embodiments. The flow diagram may not show all functions or exchanges of data, but instead provides an understanding of commands and data exchanged under embodiments of the system. Those skilled in the relevant art will recognize that some functions or exchange of commands and data may be repeated, varied, omitted, or supplemented, and other (less important) aspects not shown may be readily implemented. Moreover, each of the steps depicted in FIG. 4 can itself include a sequence of operations that need not be described herein. Those of ordinary skill in the art can create source code, microcode, program logic arrays or otherwise implement the invention based on the flow diagram of FIG. 4 and the detailed description provided herein for programming the control panel 250. It should be noted that FIG. 4 depicts a particular sequence of loading dock operations by way of example only, and in other embodiments the control panel 250 can be programmed to control loading dock equipment in virtually any particular order or sequence that a dock operator or other user may desire. Additionally, the present technology can be implemented to control various combinations of loading dock equipment, and not only the particular arrangements of equipment described above.

Figure 10A:
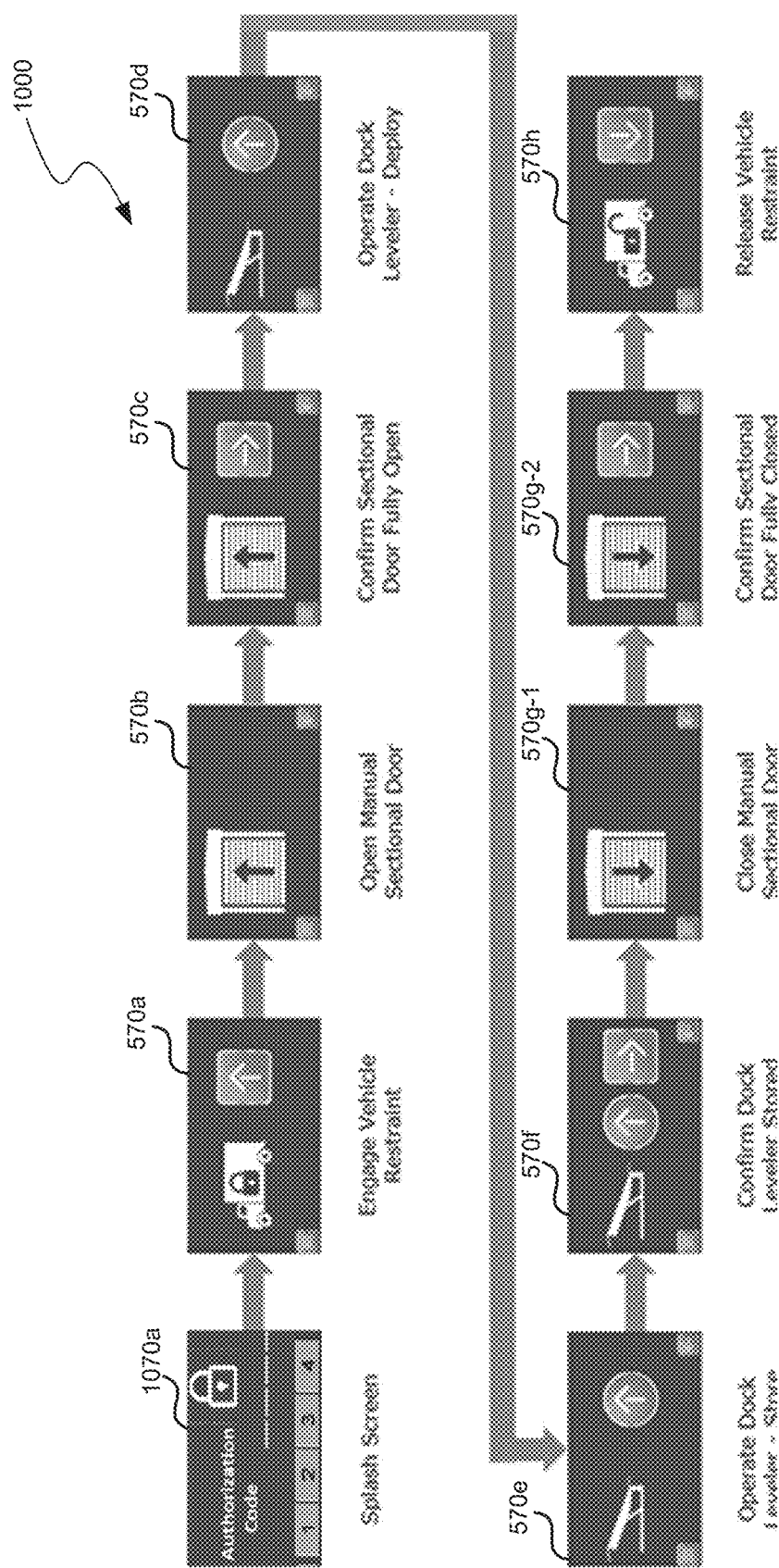
FIGS. 10A-10B each illustrates a series of screenshots, of a loading dock control panel touchscreen, with a particular sub-sequence of control elements for controlling operation of loading dock equipment in accordance with an embodiment of the present technology.

FIGS. 5A-5H are a first series of screenshots of the display screen 352 illustrating a series of displays 570a-h, corresponding to the normal operation sequence, that can be sequentially presented by the touchscreen 354 for operation of loading dock equipment in accordance with an embodiment of the present technology. FIGS. 11A-11H are a second series of screenshots of the display screen 352 illustrating displays 570a-h for a second version of displays corresponding to the normal operation sequence presented by the touchscreen 354 for operation of loading dock equipment in accordance with an embodiment of the present technology. Instead of using text as in the first series of screenshots, the second series of screenshots uses images to indicate the operations to be performed at the current stage in the sequence. In some embodiments, a combination of text and images can be used. FIG. 10A illustrates at 1000 the entire normal operation sequence using displays 570a-h. FIG. 10A also includes an initial authorization code display 1070a, described in greater detail below with reference to block 802 of FIG. 8.

As described in greater detail below, each of the displays 570a-h provides the operator with the ability to operate only a single corresponding piece of loading dock equipment at any given time, and the corresponding piece of loading dock equipment is clearly identified by text or an image in each display 570a-h to avoid operator confusion about which piece of equipment should be operated next. Moreover, the displays 570a-h enable the operator or other user to sequentially operate the various pieces of loading dock equipment only in an appropriate sequence. For example, in the illustrated embodiment, the displays 570a-h are configured so that the operator must first engage the vehicle restraint 242 with the transport vehicle before opening the dock door 246, and then the operator must open the dock door 246 before moving the dock leveler 216 into position in the vehicle. In some embodiments, when the operator is determined to have a sufficient authorization level (as described below in relation to FIG. 8), the operator can select options to skip items in the sequence, reach displays out of the normal operation sequence (e.g., through an option menu reached through options control 576), or perform alternate sub-sequences (as described below in relation to FIG. 9).

Figure 5A:
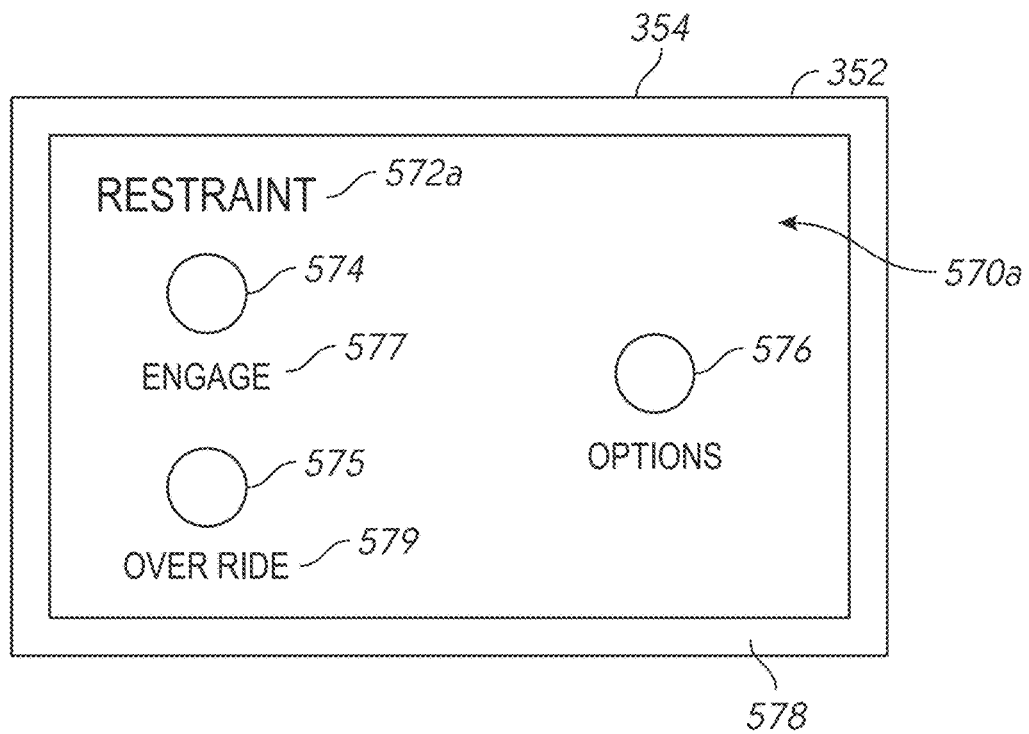
FIGS. 5A-5H are a series of screenshots of a loading dock control panel touchscreen for controlling operation of loading dock equipment in accordance with an embodiment of the present technology.
Figure 11A:
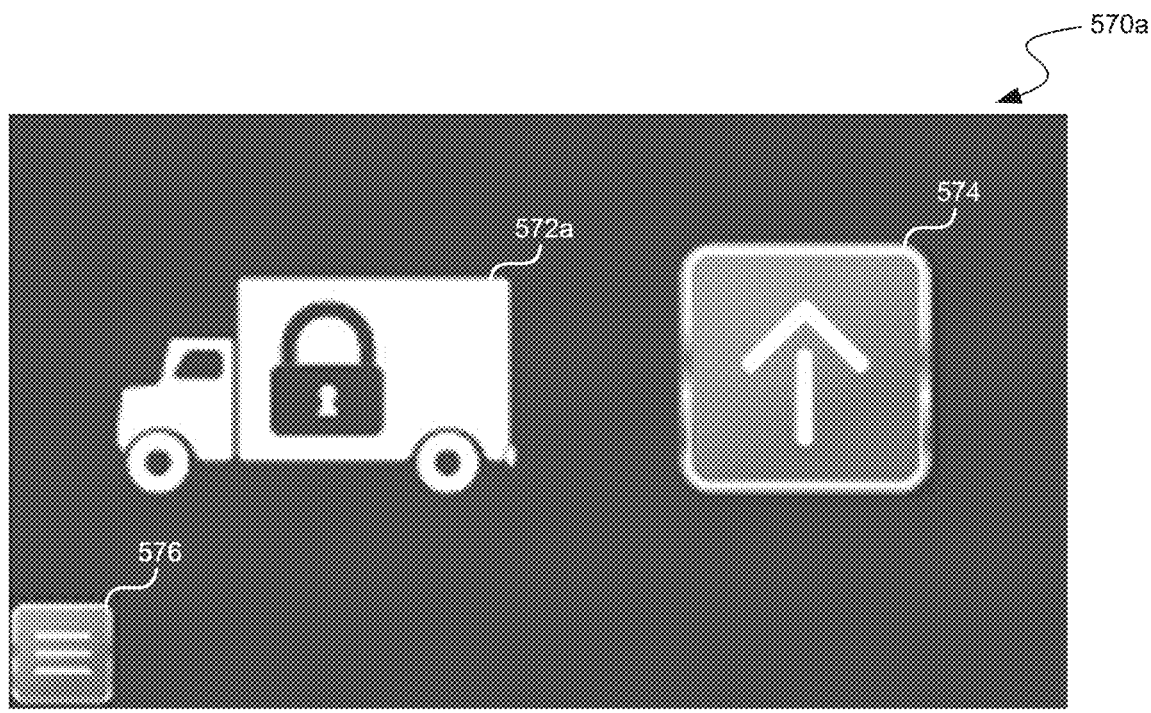
FIGS. 11A-11H illustrate screenshots of a loading dock control panel touchscreen using the sub-sequence of control elements from FIG. 10A in accordance with an embodiment of the present technology.

Referring to FIGS. 5A and 11A, when there is no vehicle present at the loading dock 210, the touchscreen 354 can provide a visual signal to loading dock operators and other users indicating this status. For example, the touchscreen 354 can display a solid or flashing red color screen in "sleep mode" that indicates no vehicle is present at the loading dock 210. In one embodiment, the presence or absence of a vehicle at the loading dock 210 can be communicated to the control panel 250 via an electrical sensor mounted to the vehicle restraint 242 that indicates when the restraint 242 is engaged with a vehicle. In another embodiment, the touchscreen 354 can be configured to display either a solid or flashing red screen to indicate the absence of a vehicle at the loading dock when the vehicle restraint 242 has been commanded to release. More specifically, if the vehicle restraint 242 has been commanded to release and it has not been overridden, then the control panel 250 can interpret this as the absence of a vehicle at the loading dock 210 and display an appropriate signal via the touchscreen 354. As will be appreciated, a solid or flashing red color is but one example of a visual signal that can be displayed by the touchscreen 354 to indicate the status of the loading dock 210. Accordingly, in other embodiments, other types of visual signals (e.g., other colors, text, etc.) and/or audible signals can be implemented by the control panel 250 to indicate dock status.

When a vehicle approaches or is present at the loading dock 210, the dock operator can touch the touchscreen 354, and the touchscreen 354 will respond by presenting the display 570a. The display 570a includes control elements such as textual indicators 577 and 579, textual or graphical indicator 572a, and/or buttons 574, 575 and 576. In some embodiments, override 575 is an option provided within a menu presented when the options control element 576 is activated. In the illustrated embodiment, the textual or graphical indicator 572a indicates to the operator that the displayed control elements are associated with operation of the vehicle restraint 242. More specifically, in some embodiments, a corresponding textual indicator 577 can indicate the graphical control element 574 is an "engage" button that can be touched by the operator to engage the vehicle restraint 242 with the transport vehicle parked at the loading dock 210. In other embodiments, graphical control element 574 can be an arrow or other icon indicating it can be pressed to control corresponding equipment. For example, an arrow icon with a particular border shape (e.g., square—as in control element 574 in FIG. 11A) can indicate that a single tap can cause a corresponding action, such as engaging a vehicle restraint, while an arrow icon with a different border shape (e.g., round—as in control element 582 in FIG. 11D) can indicate that the control element can be held down to continuously cause a corresponding action, such as deploying a dock leveler.

In some embodiments, while the display 570a is active, the touchscreen 354 can display a red border 578 and/or the indicator light 358a can be illuminated to indicate to the operator that the restraint 242 has not been engaged with the vehicle yet. Once the operator selects the "engage" button 574 and the vehicle restraint 242 begins operation, all or part the touchscreen 354 can go dark, be grayed out, etc., except for the red border 578, so that the operator is unable to operate any loading dock equipment while the restraint 242 is in motion.

As indicated by the textual indicator 579, the graphical control element 575 is an "override" button that the operator may select to override the vehicle restraint 242. In some embodiments, the override control element 575 can be accessed through an options menu reached by activating the options control element 576. By way of example, the operator may elect to override the vehicle restraint 242 if the restraint is unable to engage the vehicle properly. In this situation, selecting the "override" button 575 enables the operator to bypass operation of the vehicle restraint 242 and instead chock the vehicle wheels or otherwise restrain the vehicle at the loading dock. In some embodiments, selecting the "override" button 575 causes the touchscreen 354 to present the display 570b for operation of the dock door 246 after the operator has confirmed that the vehicle is properly restrained. In other embodiments, selecting the override button 575 can cause the touchscreen 354 to present the display 1270a to implement the alternate restraint sub-sequence described below.

As described above with reference to FIG. 4, once the vehicle restraint 242 has been engaged (or the vehicle restraint 242 has been overridden), the control panel system can automatically turn off the guide lights 237a and 237b and inflate the dock shelter 232. Alternatively, the operator can elect to manually operate the guide lights 237a and 237b and/or the dock shelter 232 by touching the "options" button 576. Doing so will cause the control panel 250 to bring up a corresponding display (e.g. display 1370a) enabling the operator to manually operate the guide lights 237a and 237b and/or the dock shelter 232.

Figure 5B:
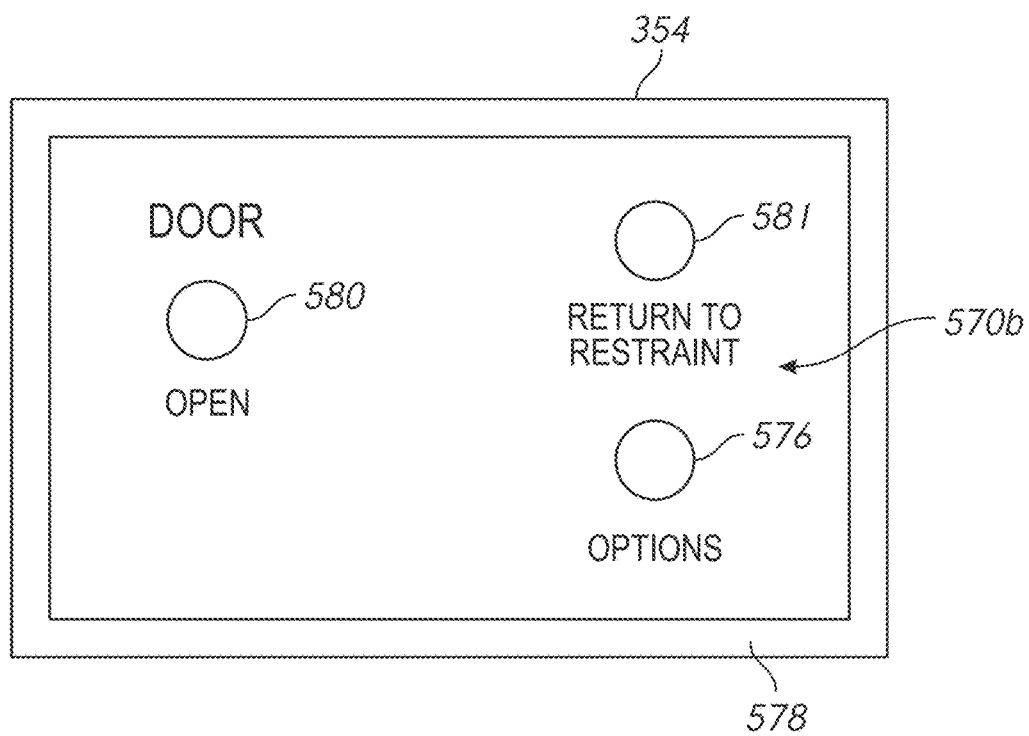
Figure 11B:
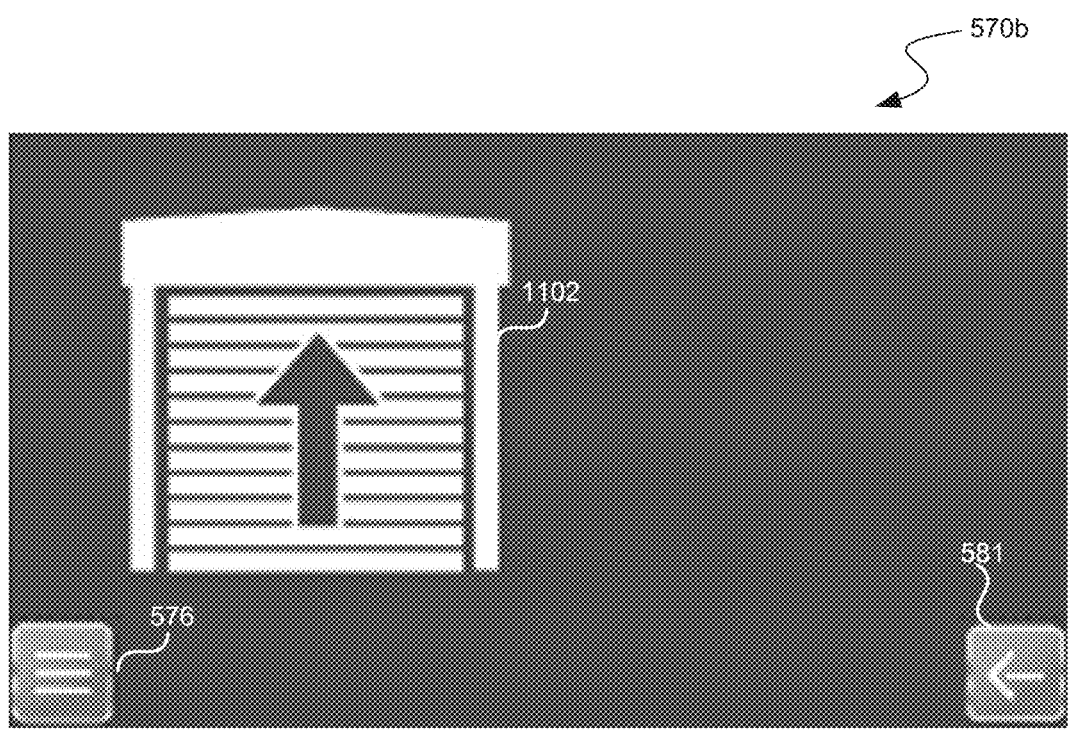

Referring next to FIGS. 5B and 11B, once the vehicle restraint 242 has been properly engaged with the vehicle, the vehicle restraint 242 can send a corresponding signal to the control panel 250 indicating that the vehicle has been properly secured at the loading dock 210. Additionally, the dock shelter 232 and the guide lights 237a and 237b can also send corresponding signals to the control panel 250 indicating that the guide lights 237a and 237b have been turned off and the dock shelter 232 has been inflated. The control panel 250 can respond to these signals or an indication that the vehicle restraint has been overridden by progressing to the "door" display 570b. As with the "restraint" display 570a described above, in some embodiments the "door" display 570b can also include the red border 578 to signal the operator that the loading dock 210 is still being prepared for vehicle access. In FIG. 5A, the display 570b includes a door "open" button 580. Touching the door "open" button 580 causes the control panel 250 to send a command that opens the dock door 246. As noted above, the other loading dock equipment (e.g., the vehicle restraint 242, the dock leveler 216, etc.) is interlocked and is accordingly non-operational while the display 570b is shown. In addition to the door "open" button 580, the touchscreen 354 also displays a "return to restraint" button 581. If the operator decides not to open the dock door 246, the operator can touch the "return to restraint" button 581 and return to the "restraint" display 570a described above for operation of the vehicle restraint 242. In FIG. 11B, the loading dock is configured with a manually operated dock door 246 and display 570b is a signal to the loading dock operator to open the dock door 246.

Figure 5C:
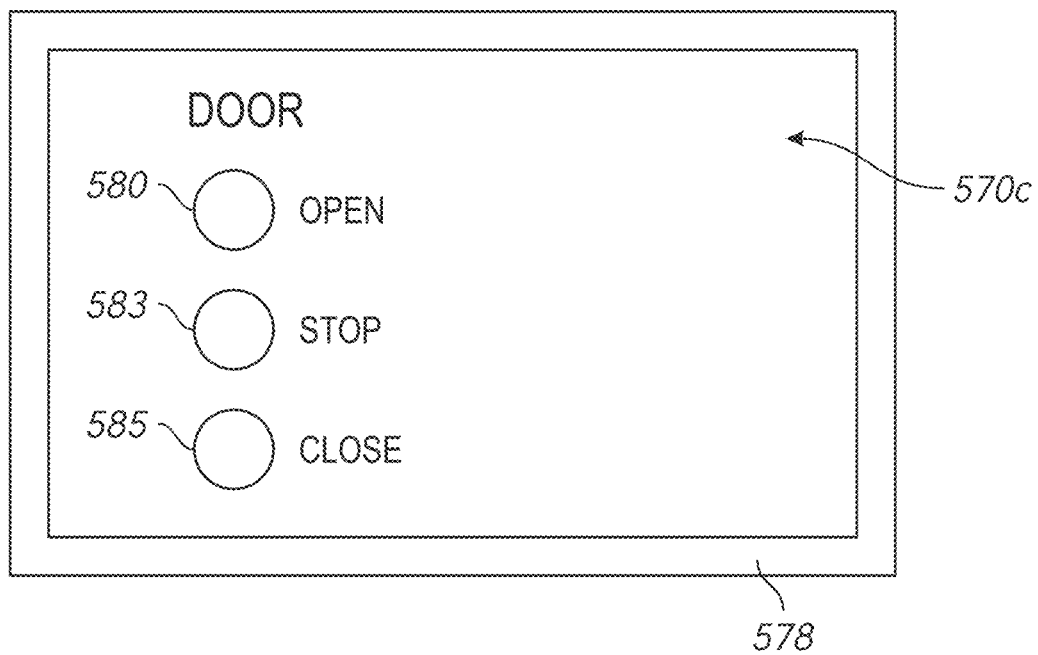
Figure 11C:
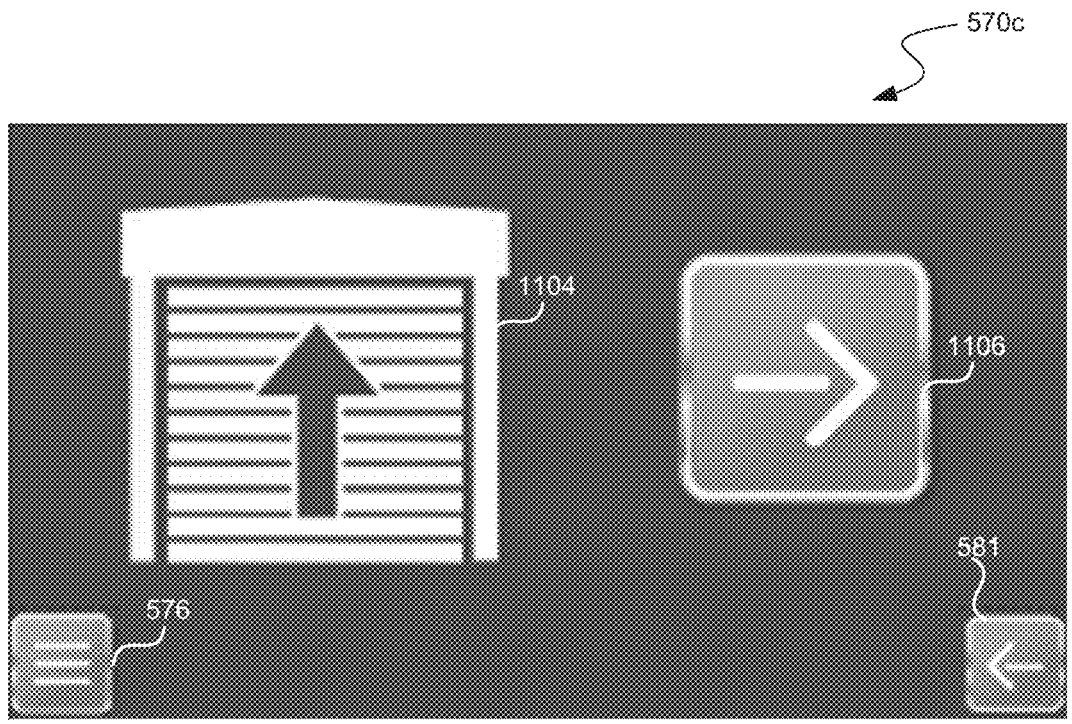

After the operator has touched the door "open" button 580 in FIG. 5B or after a delay period in FIG. 11B, the control panel 250 automatically cycles to the "door" display 570c shown in FIGS. 5C and 11C. As in FIG. 5C, where the dock door 246 is controlled by the control panel 250, the display 570c can include a "door open" button 580, a "door stop" button 583, and a "door close" button 585. While the door 246 is opening, the "door open" button 580 can have an opaque or other visual appearance to signify that it is inoperative. If the operator wishes to stop the door 246 before it is fully open, the operator can do so by touching the "door stop" button 583. Similarly, if the operator wishes to close the door 246, the operator can do so by touching the "door close" button 585. As in FIG. 11C, where the dock door 246 is manually controlled, the display 570c can include a "confirm door open" button 1106 which the dock operator can tap to signal the dock operator has opened the dock door 246.

As noted above with reference to FIG. 4, after the dock door 246 has been opened, the control panel system can automatically turn on the loading light 230 and the air curtain 248. Alternatively, the operator can select (i.e., touch) the "options" button 576 to bring up a corresponding display of graphical control elements that enable the operator to manually operate the loading light 230 and/or the air curtain 248.

Figure 5D:
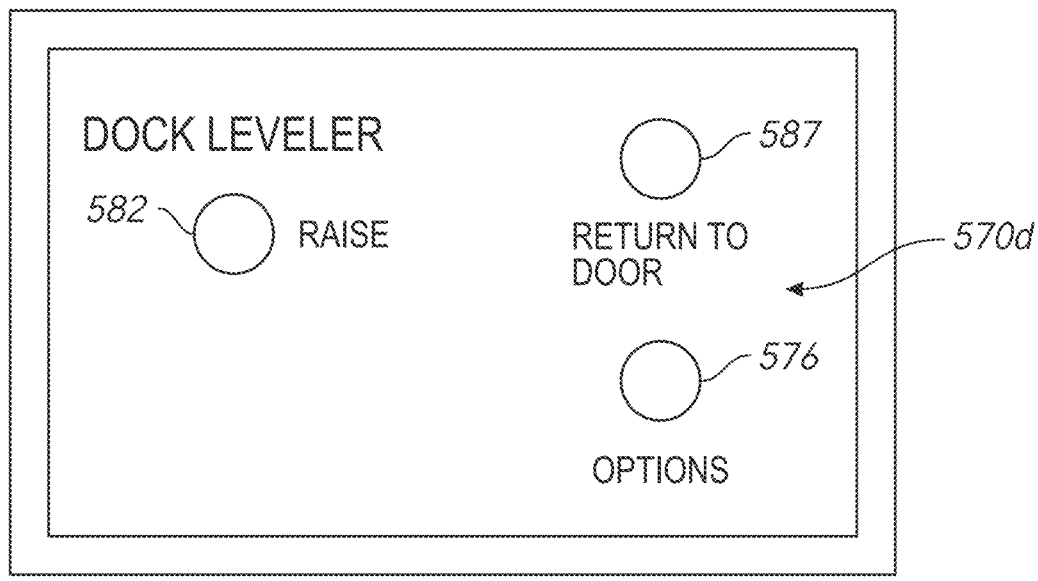
Figure 11D:
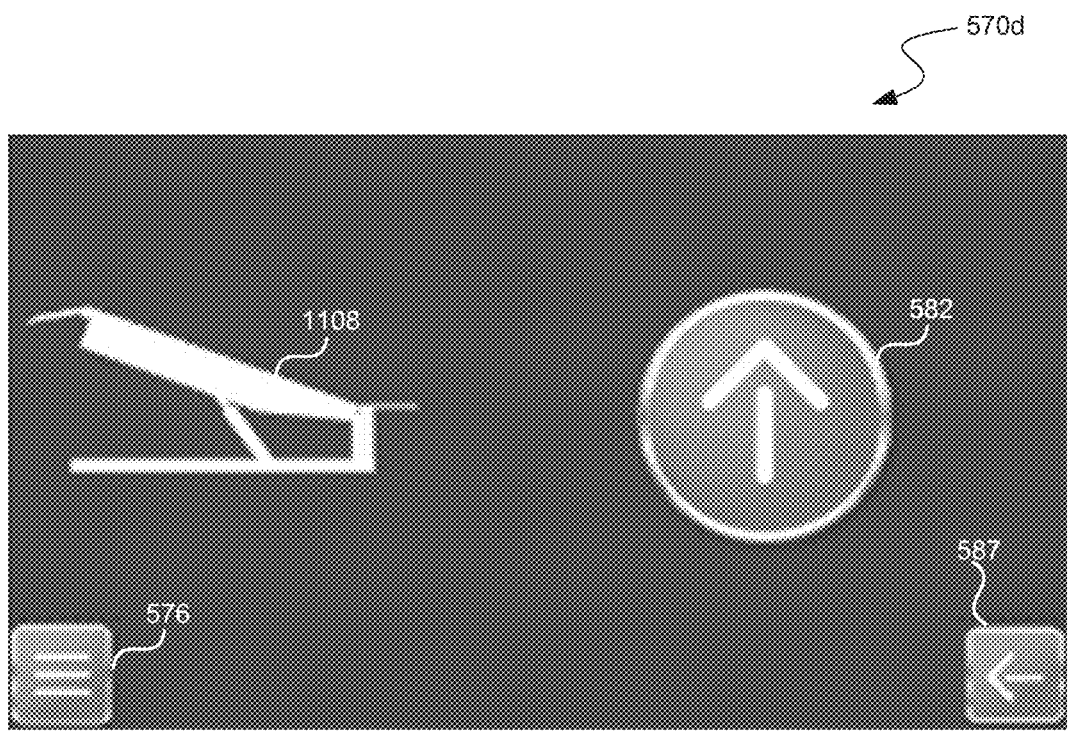

Referring next to FIGS. 5D and 11D, in the illustrated embodiment the control panel 250 automatically cycles to the "dock leveler" display 570d once the dock door 246 has been fully opened, the loading light 230 is on, and the air curtain 248 is on. In FIG. 11D, the dock leveler icon 1108 is displayed to indicate to the dock operator that the current display is for controlling the dock leveler 216. Assuming the dock leveler 216 is in a stored position as shown in FIG. 2A, the operator can touch (e.g., press) a "raise" button 582 to raise the dock leveler 216 from the stored position. Alternatively, the operator can touch a "return to door" button 587 if the operator wishes to reverse the sequence and return to the display 570c for operation of the dock door 246 as described above. The operator continues touching the "raise" button 582 for as long as the operator wishes to raise the dock leveler 216. While the dock leveler 216 is in motion, the control panel 250 automatically cycles the touchscreen 354 to the "dock leveler" display 570e shown in FIG. 5E.

Figure 5E:
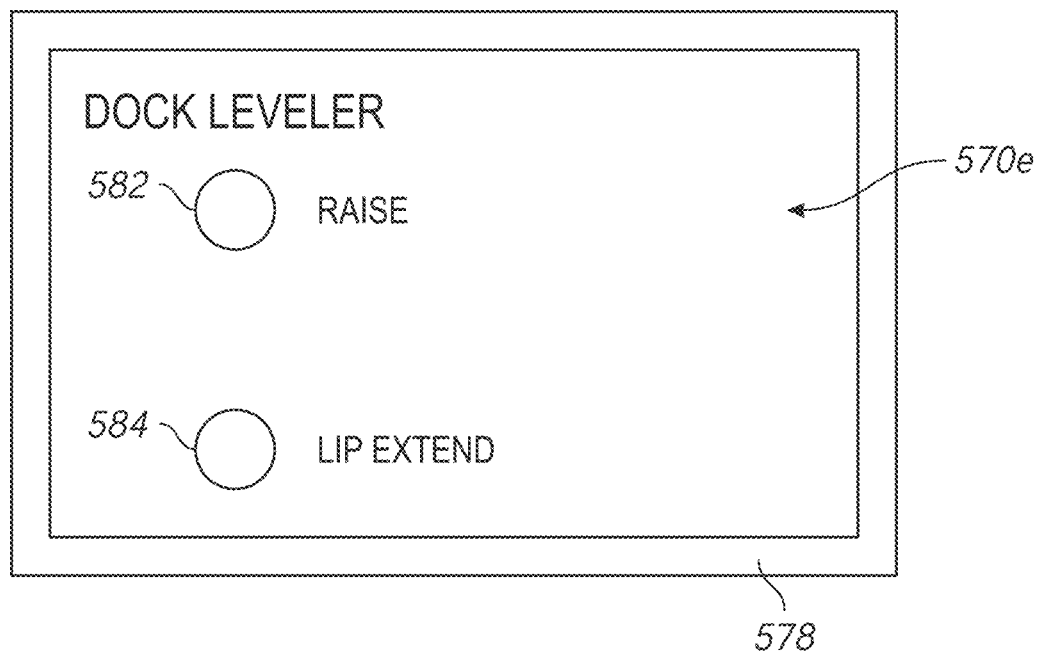
Figure 11E:
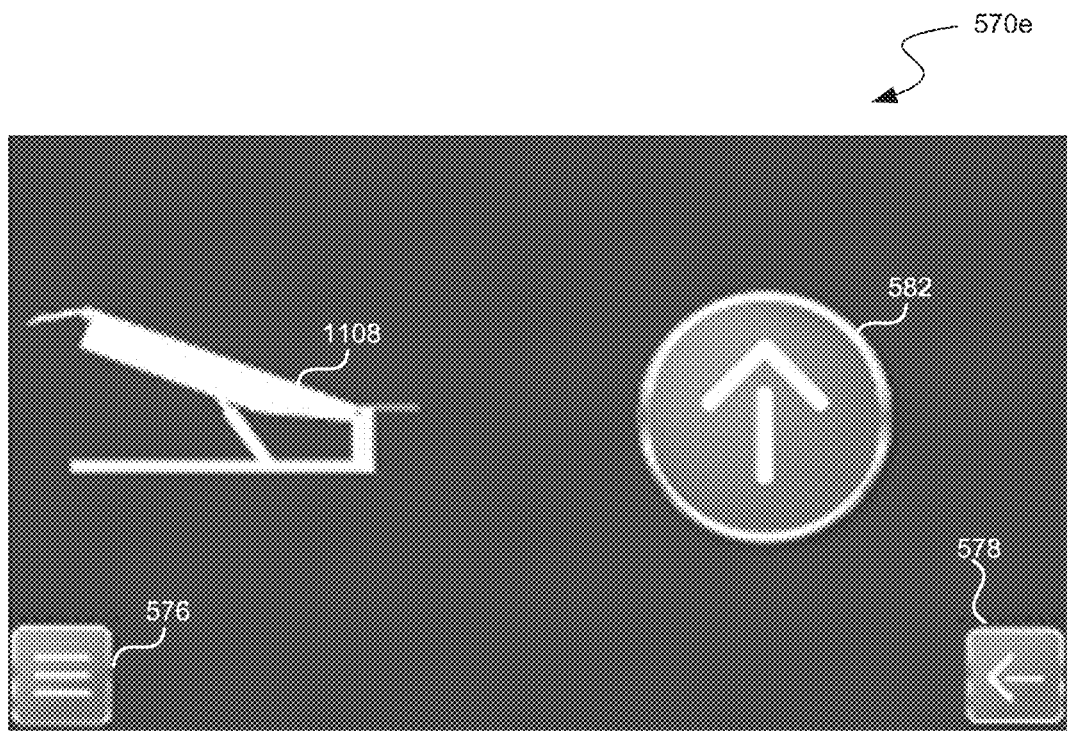

Referring next to FIGS. 5E and 11E, displays 570e can be provided to control deploying the dock leveler 216. In FIG. 5E, although the display 570e can include a "lip extend" button 584, this button can have an opaque or other visual appearance to visually indicate that it is inoperable while the operator is raising the dock leveler 216. Once the dock leveler 216 is fully raised, the operator can stop touching the "raise" button 582, which will then render the "lip extend" button 584 operable. Releasing the "raise" button 582 will also allow the dock leveler 216 to descend, and the operator can then touch the "lip extend" button 584 to extend the dock leveler lip 220. In some embodiments, as in FIG. 11E, instead of having separate raise and lip extend control elements, button 582 can automatically control both raising the dock leveler 216, e.g., once the dock leveler 216 has been raised the button 582 can transition to controlling extension of the dock leveler lip 220. Once the lip 220 has been fully extended, the operator can stop touching the "lip extend" button 584 or button 582 and let the lip 220 come to rest on the bed of the trailer. The touchscreen 354 can continue displaying the red border 578 while the dock leveler 216 is in motion.

When the dock leveler 216 is in position in the vehicle, as noted above with reference to FIG. 4, the control panel 250 can command the barrier gate 226 to automatically raise the gate arm 228 to allow access for workers and/or fork lifts into the vehicle. Alternatively, the operator can touch the "options" button 576 if the operator wishes to manually operate the barrier gate 226. Once the dock leveler 216 has been properly installed in the vehicle and the barrier gate arm 228 has been raised, the touchscreen 354 can display a green border 579 and/or indicator light 358c can be illuminated indicating to the dock operator that it is now safe to enter the vehicle and unload and/or load goods, materials, etc. Additionally, during a normal loading and/or unloading process, the touchscreen 354 can go into a "sleep mode" in which it displays a visual signal to indicate to the dock operator and other dock workers that the trailer is secure for normal loading and/or unloading procedures. For example, the touchscreen 354 can display a solid or flashing green color to signify the all-safe condition.

Figure 5F:
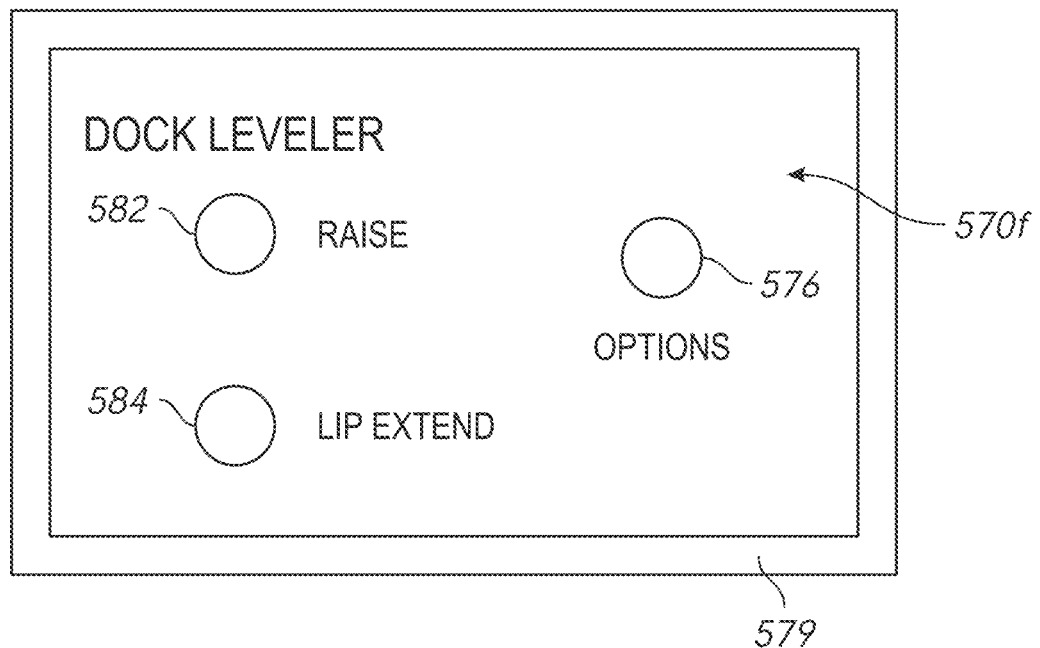
Figure 11F:
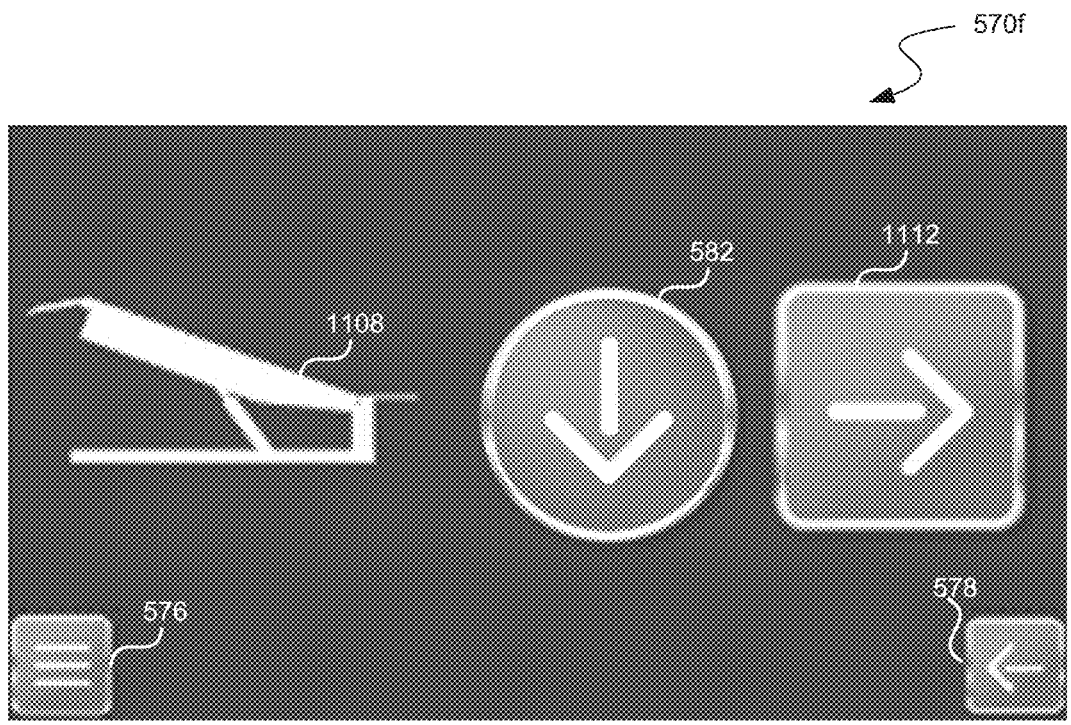

Once the unloading and/or loading process is complete, the dock operator can touch the touchscreen 354 to bring up the display 570f shown in FIGS. 5F and 11F. In FIG. 5F, the dock operator can first press the "lip extend" button 584 to retract the dock leveler lip 220 and then the dock operator can press the "raise" button 582 to lift the dock leveler 216 out of the vehicle. In FIG. 11F, the dock operator can use button 580 to both first retract the dock leveler lip 220 and then continue pressing the button 582 to lift the dock leveler 216 out of the trailer. The operator continues touching the "raise" button 582 to cause the dock leveler 216 to continue moving away from the trailer bed. The dock operator stops touching the "raise" button 582 once the dock leveler 216 has been sufficiently raised and descended to its stored position in the pit 222. While the dock leveler is in motion, the touchscreen 354 can display the red border 578 and/or illuminate red indicator light 358a as an indication that the dock leveler 216 is not in place. As shown in FIG. 11F, in some embodiments, a "confirm dock leveler stored" button 1112 can appear when a cycle for storing the dock leveler is complete (e.g., when the operator stops pressing button 582 or based on a sensor reading from the dock leveler 216 indicting it is stored). As noted above with reference to FIG. 4, once the dock leveler 216 has been fully stored, the dock control system can automatically command the barrier gate 226 to lower the gate arm 228. Alternatively, the operator can touch the "options" button 576 to bring up a corresponding display that enables the operator to manually control the barrier gate 226.

Figure 5G:
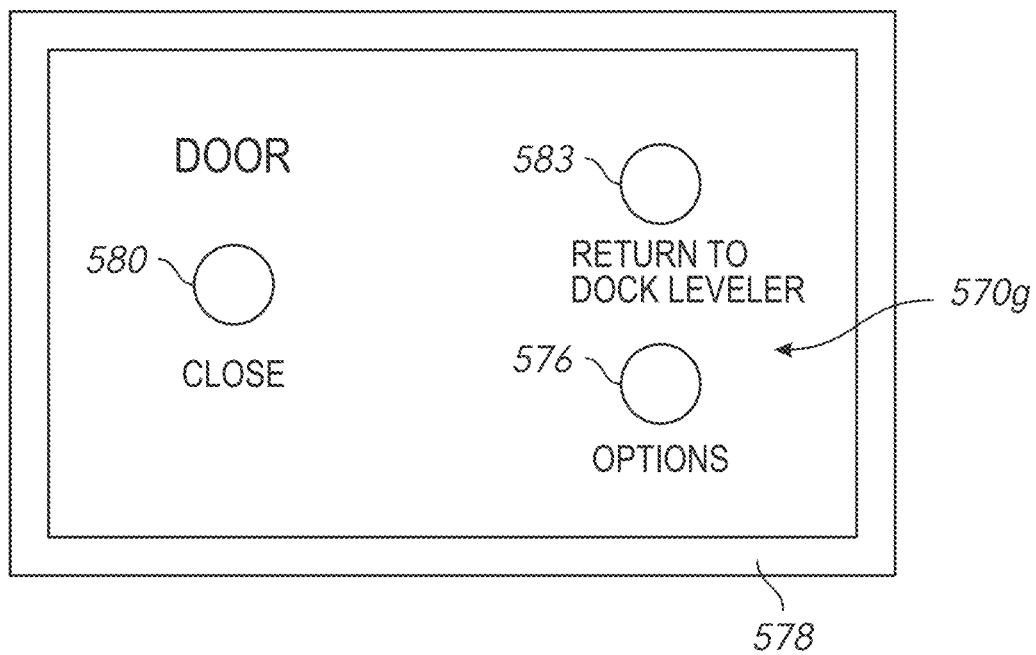
Figures 1, 11G:
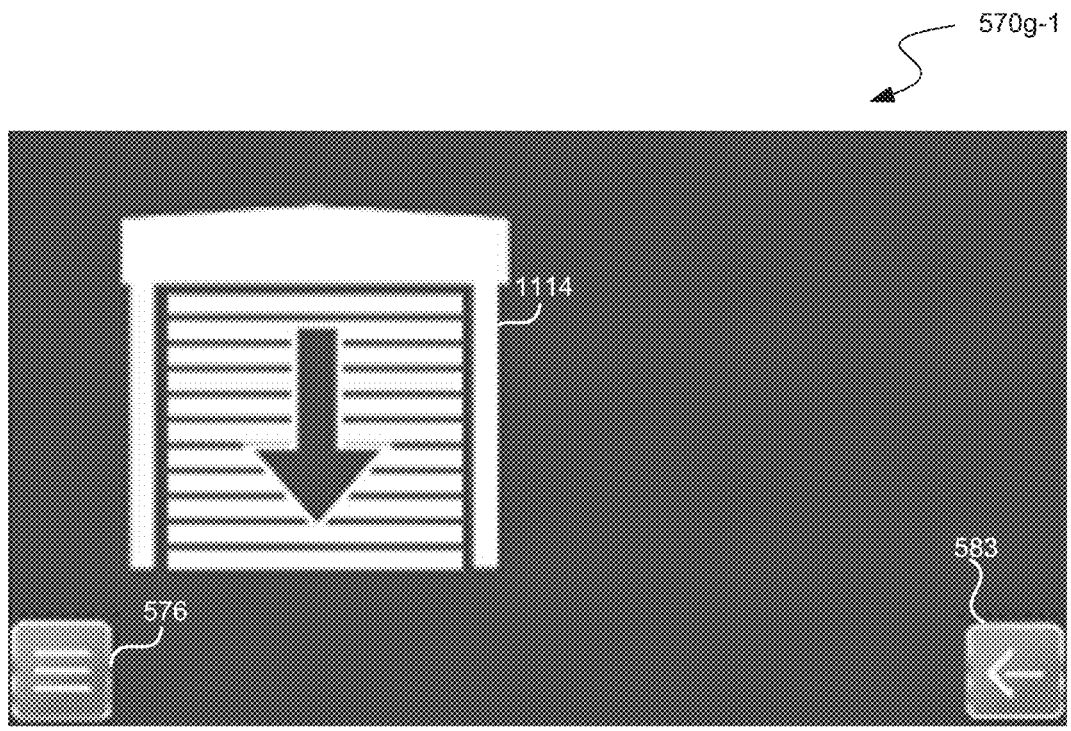
Figures 2, 11G:
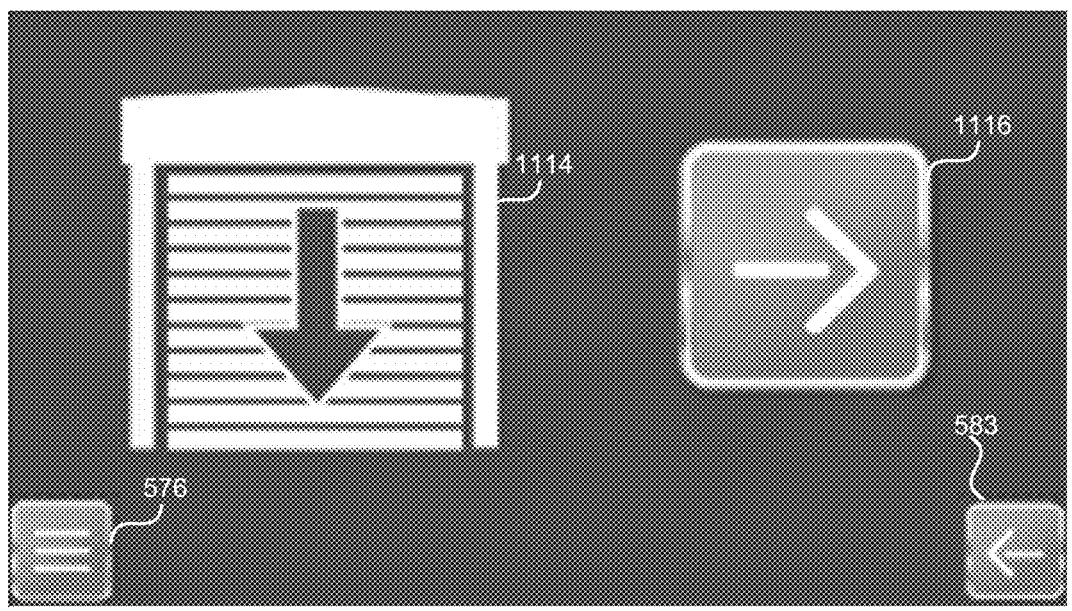

Referring next to FIGS. 5G, 11G-1 and 11G-2, once the dock leveler 216 has been fully stored, the control panel 250 automatically cycles to the "door" display 570g (shown as displays 570g-1 and 570g-2 in FIGS. 11G-1 and 11G-2) to enable the operator to close the dock door 246. Display 570g includes a "return to dock leveler" button 583 and the "options" button 576. In FIG. 5G, the door 246 is controlled through the control panel 250 and the display 570g includes a door "close" button 580 to operate the door 246. The operator touches the door "close" button 580 to lower and close the dock door 246. In FIGS. 11G-1 and 11G-2, the dock door 246 is manually controlled. Display 570g-1 shows icon 1114 to instruct the dock operator to close the dock door 246. Display 570g-2 also shows "confirm door closed" button 1116, which the dock operator can tap to signal the dock operator has closed the dock door 246.

As noted above with reference to FIG. 4, the dock control system can automatically turn off the loading light 230 and the air curtain 248. Alternatively, the operator can elect to manually control one or both of these pieces of equipment by selecting the "options" button 576. Additionally, if for some reason the operator wishes to open the dock door 246 and go back into the trailer, the operator can depress the "return to dock leveler" button 583, which will return to a display of buttons and/or other graphical control elements that enable the operator to return to controls for the dock leveler 216.

Figure 5H:
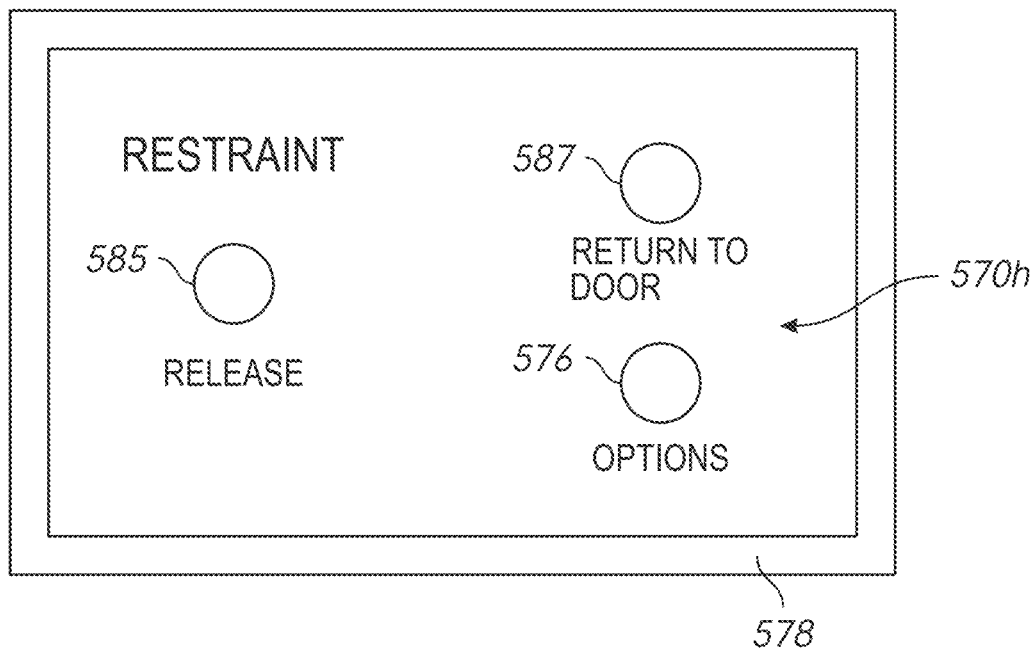
Figure 11H:
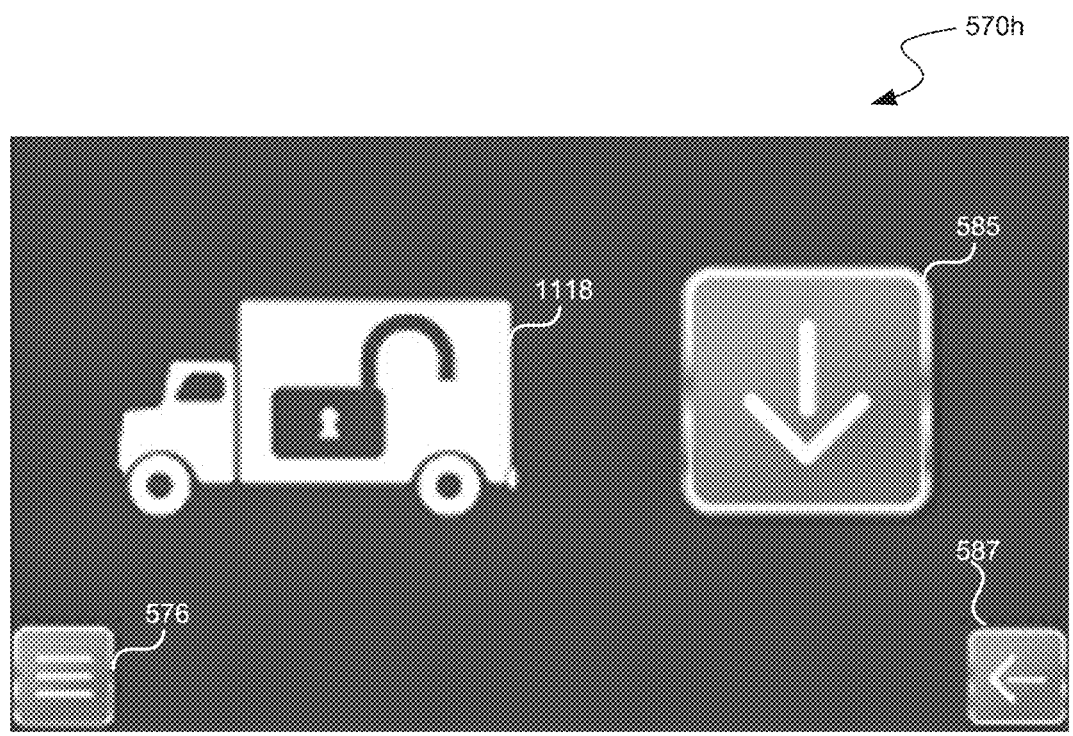

Referring next to FIGS. 5H and 11H, once the dock door 246 has been fully closed, the control panel 250 cycles to the "restraint" display 570h to enable the operator to release the vehicle restraint 242. More specifically, the touchscreen display 570h includes a "release" button 585, a "return to door" button 587, and the "options" button 576. In FIG. 11H, display 570h includes icon 1118 indicating the display is for releasing the vehicle restraint. If for some reason the dock operator wishes to leave the vehicle restraint 242 engaged and re-open the dock door 246, the operator can do so by touching the "return to door" button 587. If instead the dock operator wishes to release the vehicle, the operator can do so by touching the "release" button 585 to disengage the vehicle restraint 242 from the vehicle. As noted above with reference to FIG. 4, once the vehicle restraint hook 244 has been fully retracted and disengaged from the vehicle, the control system can automatically turn off the guide lights 237a and 237b and automatically deflate the inflatable shelter 232. Alternatively, if the operator wishes to manually control one or both of these systems, the operator can do so by touching the "options" button 576. The touchscreen 354 continues to display the red border 578 and/or illuminate indicator light 358a during these operations to signify to the operator and others that the loading dock is not safe for unloading/loading operations at this time.

Figure 12A:
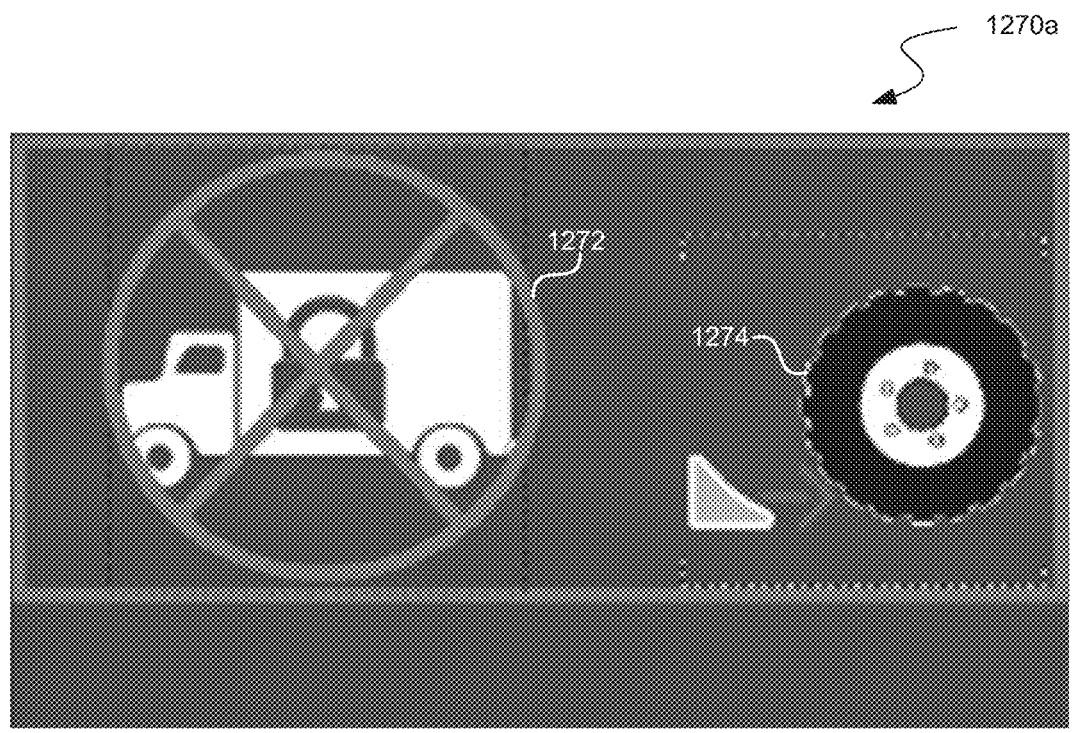
FIGS. 12A-12C illustrate screenshots of a loading dock control panel touchscreen using the sub-sequence of control elements from FIG. 10B in accordance with an embodiment of the present technology.
Figure 12B:
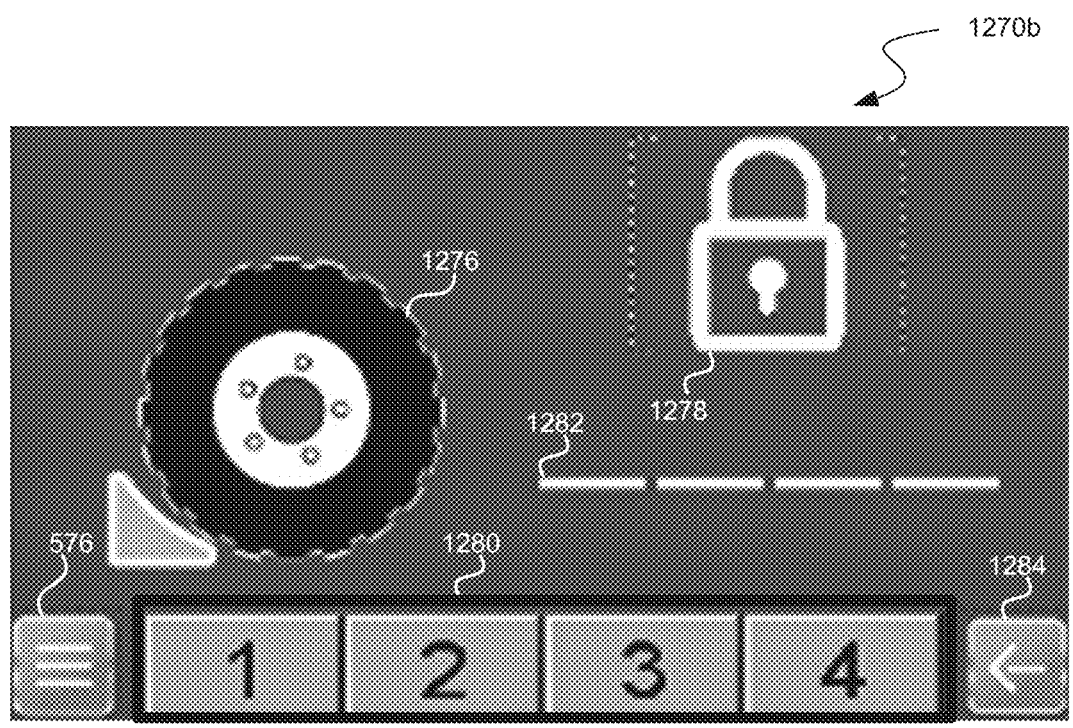
Figure 12C:
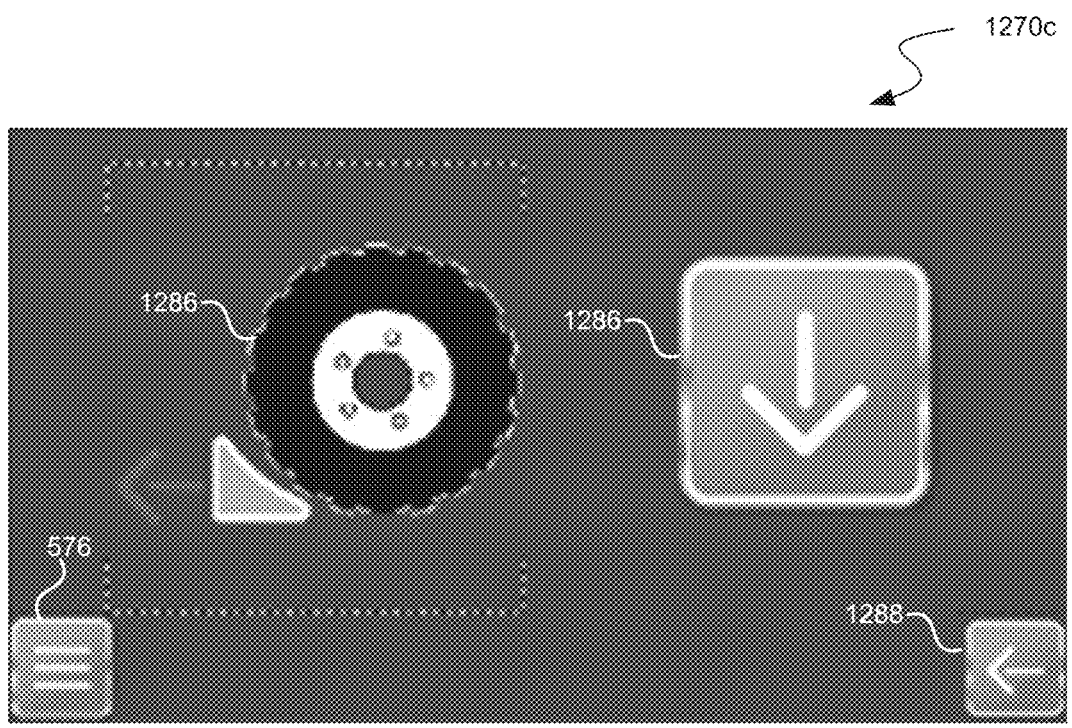
Figure 13A:
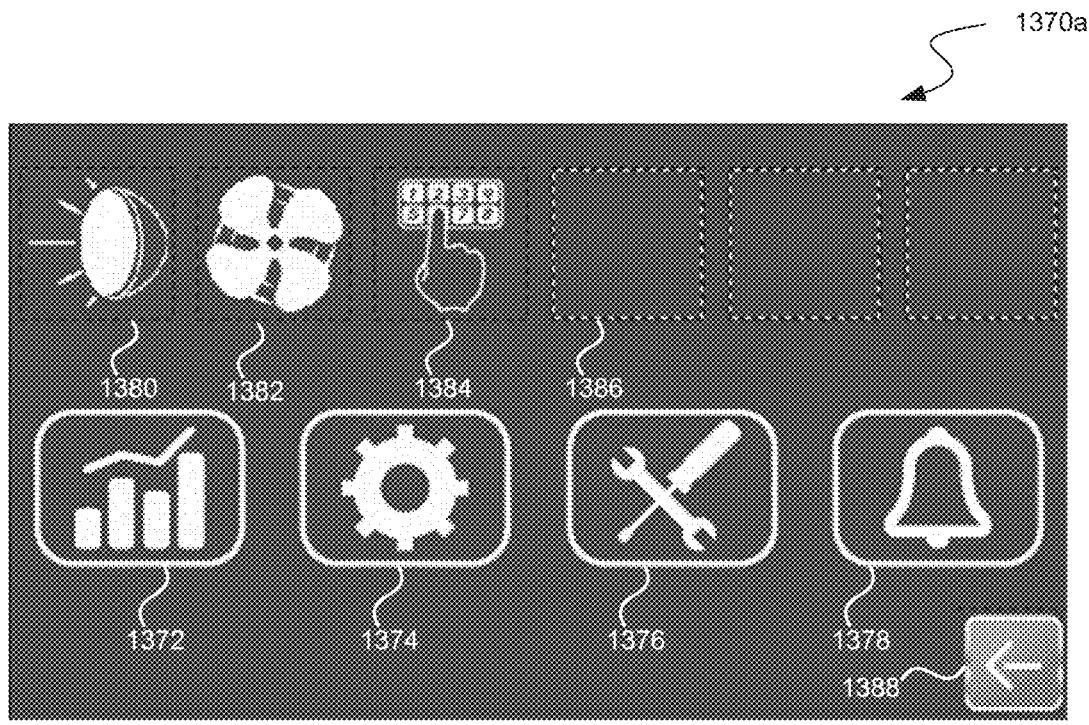
FIGS. 13A-13E illustrate screenshots of a loading dock control panel touchscreen with menu, settings and configuration control elements in accordance with an embodiment of the present technology.
Figure 13B:
Figures 13C, 13D:
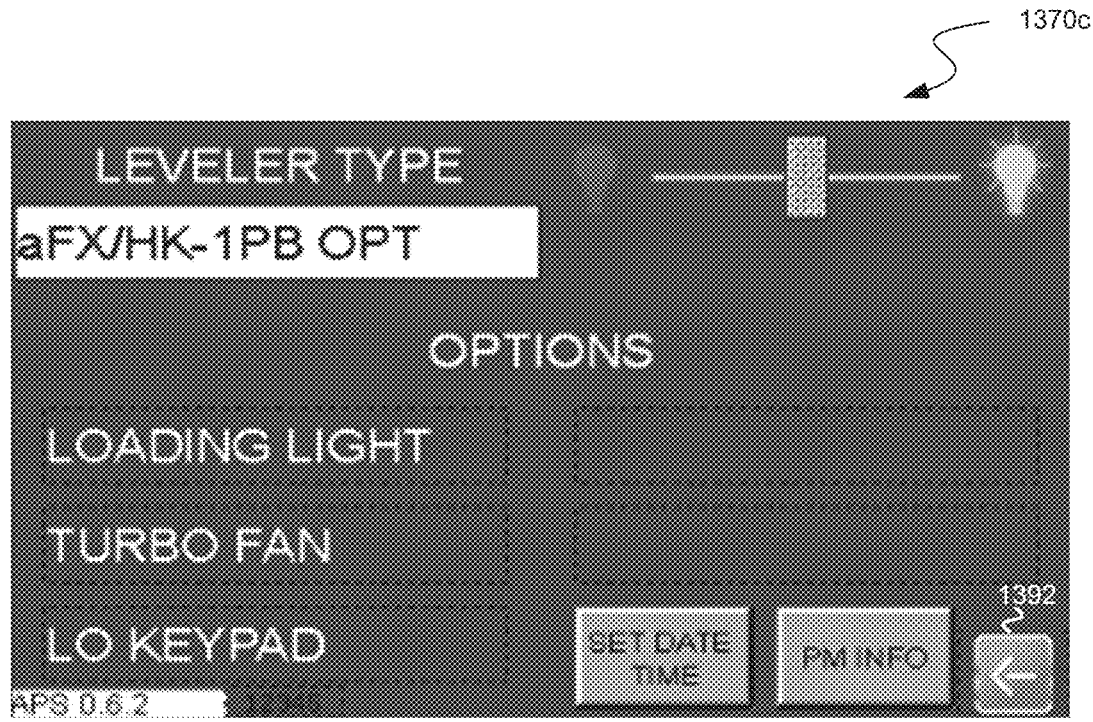
Figure 13E:
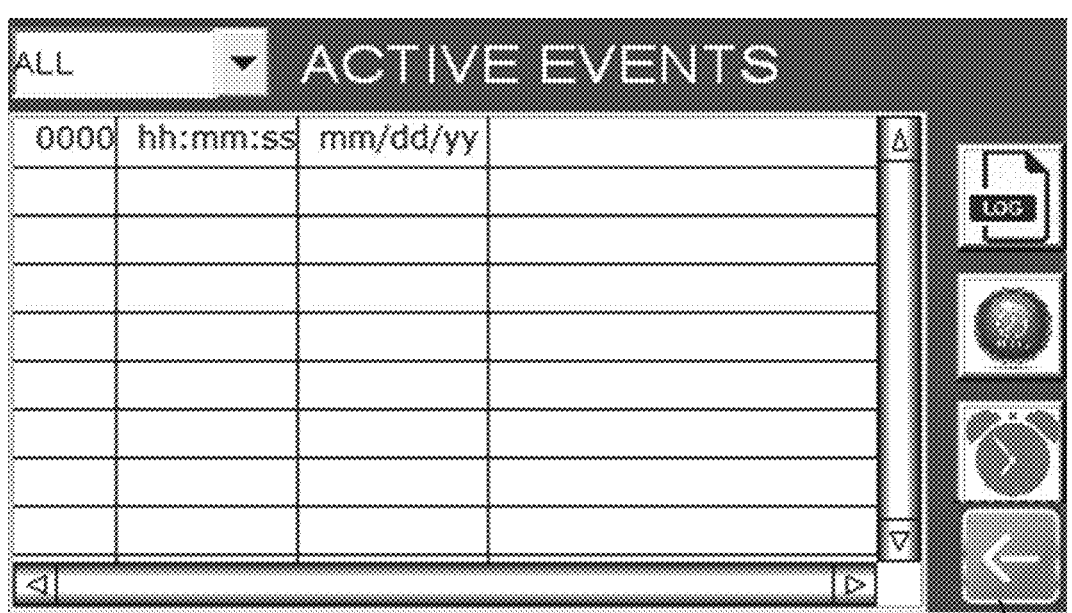
Figure 14A:
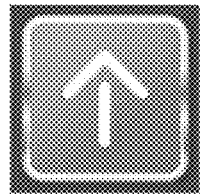
FIGS. 14A-14M illustrate control elements for use in a loading dock control panel touchscreen in accordance with various embodiments of the present technology.
Figure 14B:
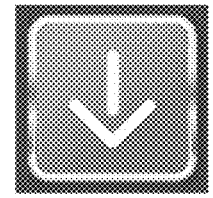
Figure 14C:
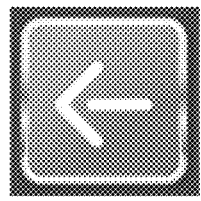
Figure 14D:
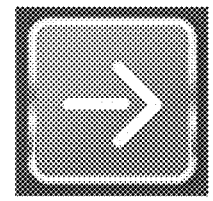
Figure 14E:
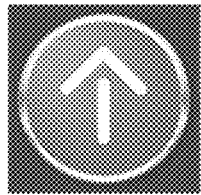
Figure 14F:
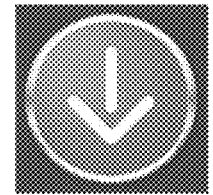
Figure 14G:
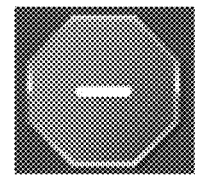
Figure 14H:
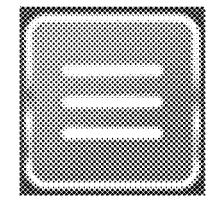
Figure 14I:
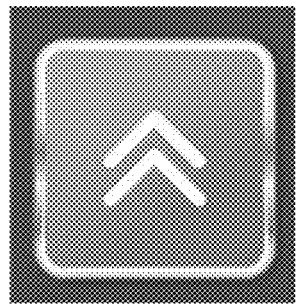
Figure 14J:
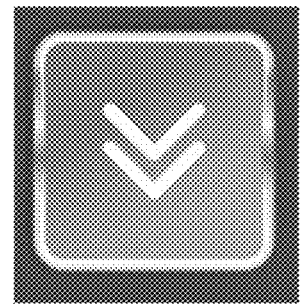
Figure 14K:
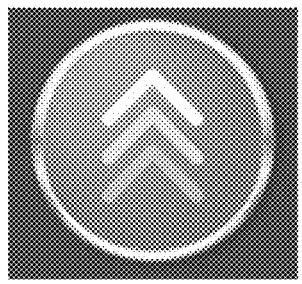
Figure 14L:
Figure 14M:

FIGS. 12A-12C are a second series of screenshots of the display screen 352 illustrating a series of displays 1270a-1270c corresponding to sub-sequences of control elements provided as an alternative to portions of the normal operation sequence. The conditional selection of sub-sequences for the display screen 352 is described in greater detail below in relation to FIG. 9. The displays 1270a-1270c can be used in the condition where the vehicle restraint 242 is being overridden and wheel chocks are used instead. FIG. 10B illustrates at 1050 how the alternate sub-sequence using the displays 1270a-1270c can be used as an alternative to portions of the normal operation sequence, namely the displays 1270a-1270c are included at various points in the sequence and the display 570h is excluded from the sequence.

Referring to FIG. 12A, in the illustrated embodiment the control panel 250 has identified that the vehicle restraint 242 has not engaged and in response shows the display 1270a. This determination can be based on a sensor monitoring the vehicle restraint 242 or can be in response to the dock operator initiating an override of the vehicle restraint 242. The display 1270a includes an icon 1272 indicating that the vehicle restraint 242 is not in use and an icon 1274 indicating that the dock operator should use wheel chocks instead. If a current authorization level for the control panel 250 is not sufficient to permit use of wheel chocks instead of the vehicle restraint 242, the touchscreen 354 can continue to the display 1270b. If a current authorization level for the control panel 250 is sufficient to permit use of wheel chocks instead of the vehicle restraint 242, the touchscreen 354 can return to the normal operation sequence at the display 570b or can present an alternative version of the display 1270b that instead of requiring a code has a control element for the operator to confirm the wheel chocks are in place. Additional details on establishing and using authorization levels are described below in relation to FIG. 8.

Referring next to FIG. 12B, in the illustrated embodiment the control panel 250 needs a higher level of authorization to allow the use of wheel chocks instead of the vehicle restraint 242. The display 1270b is provided with an icon 1278 indicating the display 1270b is for changing an authorization level and with the icon 1276 indicating the authorization change is for using wheel chocks. The display 1270b further includes an input section 1280 which allows a user to input an authorization code and a display area 1282 showing characters or placeholders (e.g., * characters) corresponding to user input. The display 1270b also includes the options control 576 and a control 1284 for returning to a previous display, such as the display 570a. In some embodiments, instead of the control panel 250 presenting the display 1270b, the control panel 250 can request an increase in the authorization level from a remote source, such as via a computing device of a loading dock supervisor. The supervisor's computing device can provide a display, such as the display 1270b, for increasing authorization to use wheel chocks or to confirm (e.g., via remote video) that the wheel chocks are in place. In some embodiments, the supervisor can receive additional information such as a message from the dock operator or images of wheel chocks being correctly placed, before entering his authorization code. While the interface 1280 is shown as having numerals 1-4, other configurations can be used such as numerals 0-9, an alphabet, a pattern, etc. In some embodiments, when the vehicle restraint 242 is being overridden, amber light 358b is illuminated to indicate the override. Once the authorization level has been increased to allow the use of wheel chocks instead of the vehicle restraint 242, the touchscreen 354 can return to the normal operation sequence at the display 570b.

Once the vehicle has been loaded or unloaded and the loading dock door 246 has been closed through display 570g, because wheel chocks were used, the control panel 250 shows display 1270c. The display 1270c includes icon 1286 signaling to the dock operator to remove the wheel chocks. The dock operator can indicate the wheel chocks have been removed by tapping control element 1286. In some embodiments, where the authorization level was increased via the display 1270b, the authorization level can be reduced back to its previous level in response to tapping the control element 1286. The display 1270c also includes the options control 576 and a control 1288 for returning to a previous display, such as display 570g-2. Also in response to tapping the control element 1286, the control panel 250 can perform additional operations similar to those performed in response to the display 570h, such as automatically turning off the guide lights 237a and 237b and automatically deflating the inflatable shelter 232.

In addition to providing efficient controls for loading dock equipment, in other embodiments the touchscreen 354 can also display features (e.g., menus, search fields, etc.) that enable the operator to access a logic diagram, a system schematic, and/or other content that indicates the status of the input and output contacts of the logic sequence at any point in the operation of the loading dock equipment for maintenance and troubleshooting. In some cases, these functions can be accesses through a display 1370a, which the control panel 250 can show when the dock operator taps control element 576. The display 1370a can include a "lighting" button 1380 which can provide controls (not shown) for operating various loading dock lights; a "fan" button 1382 which can provide controls (not shown) for operating a loading dock fan; or an "authorize" button 1386 which can provide a display similar to the display 1070a for changing the current authorization level. The display 1370a can also have a "statics" button 1372 for displaying display 1370b, a "setting" button 1374 for displaying display 1370c, an "I/O" button 1376 for displaying display 1370d, a back button 1388 to return to a the display from which display 1370a was opened, and an "alerts" button 1378 for displaying display 1370c. Additionally, the display 1370a can be configured to provide other information, e.g., in additional spaces such as space 1386, that would enable the operator to potentially change the operational sequence for various pieces of loading dock equipment, perform vehicle restraint overrides, reconfigure the various touchscreens for a particular application, remediate a particular malfunction, etc.

The display 1370b can include statistics for control panel 250, such as number of uses of the vehicle restraint 242, the dock leveler 216, and the door 246. These statistics can be kept for all time, since they were last checked, since the last performed preventative maintenance (PM) or, for the vehicle restraint 242, the number of overrides. Display 1370b can also include a control 1390 for returning to the display 1370a and a reset control 1391 for resetting the maintenance statistics.

The display 1370c can include various controls for the control panel 250, such as screen brightness, an indication of the loading dock equipment such as the leveler type, lights, fan, and keypad, a control to set the date/time, and/or a control for setting a maintenance schedule. The display 1370c can also include a control 1392 for returning to the display 1370a.

The display 1370d can include indicators of input, output and status values for internal components of the control panel 250. These indicators can help debug the control panel without having to physically open it. For example, if some piece of loading dock equipment becomes inoperable and/or the control panel 250 does not appear to be functioning properly, rather than having to open up the control panel to visually inspect the various input and output contacts for the equipment control system directly (and subject the technician to potential injury from, e.g., arc-flash), the technician can instead tap control 576 to show the display 1370a and then tap control 1376 to show the display 1370d, which includes a schematic of the input and output contacts at that particular point in the process and identify the source of the problem. The display 1370d can also include a control 1394 for returning to the display 1370a.

The display 1370e can include indicators of events or alerts logged at the control panel 250. Such alerts and events can include, for example, equipment activations, equipment faults, vehicle restraint overrides, sensor readings, emergency stops, authorization level changes, maintenance operations, etc. The display 1370e can also include a control 1396 for returning to the display 1370a.

As the foregoing descriptions of FIGS. 5A-5H, 11A-11H, 12A-12C and 13A-13E demonstrate, embodiments of the control panel 250 described herein can provide a series of touchscreen displays that provide for sequential control of loading dock equipment in an appropriate manner, and prevent, or at least substantially prevent, the operator from inadvertently controlling a piece of equipment that could lead to equipment damage or an unsafe situation. The touchscreen displays described herein can also reduce operator confusion about which piece of equipment should be activated next and can simplify any operator training that may be required. Although various display sequences and associated graphical and textual elements have been described above by way of examples of some embodiments of the present technology, those of ordinary skill in the art will appreciate that other embodiments can have other display sequences and other arrangements of graphical and textual elements for providing intelligent control of interlocked loading dock equipment without departing from the spirit or scope of the present disclosure. Although some particular sequences of loading dock operations have been described above by way of example, as will be apparent to those of ordinary skill in the art, the touchscreen control panel system described herein can be implemented with other arrangements of loading dock equipment and/or any other systems of industrial equipment where sequences or order of operations is desirable, and where the control operator may be confused by a set of controls and/or control decisions at any point in the process. For example, in some embodiments a dock leveler may be used with an "open" loading dock that lacks a loading dock door. In such embodiments, displays for control of a dock door can be omitted and touchscreen displays for control of the dock leveler can follow touchscreen displays for control of the vehicle restraint. In some embodiments, the control panel can automatically identify such loading dock configurations and provide a corresponding sequence of displays.

Although the touchscreen 354 described above is configured to display touch-sensitive graphical control elements (e.g., buttons) that enable an operator to control the associated loading dock equipment by touching the control elements, in other embodiments the touchscreen 354 may be omitted and the touch-sensitive graphical control elements described above can be replaced by non-touch-sensitive control elements (e.g., buttons, icons, etc.) displayed on the display screen 352 that the operator can select by, for example, "clicking" on the control element using a mouse or other known pointing device. In these other embodiments, the display screen 352 can be configured to sequentially present displays that are the same as, or at least similar to, the displays 570a-h, 1070a, 1270a-c and/or 1370a-e described above, with the difference being that the graphical control elements are selected via a pointing device rather than the user's touch. In still further embodiments, the touchscreen 354 may be omitted and the control panel can include one or more multifunction buttons or controls (e.g., manually depressible buttons) positioned adjacent to the display screen 352. In these embodiments, the display screen 352 can cycle through a series of textual and/or graphical prompts that instruct the operator as to which of the buttons the operator should depress to operate the loading dock equipment according to the sequence described above. In these embodiments, the buttons would be "blank," but their functions would change depending on where the dock equipment system was in the process flow, and the display screen 352 would provide textual descriptions of the current button functions. Accordingly, embodiments of the present technology are not limited to use with touchscreens and/or touch-sensitive control elements.

Although the displays 570*a-h* and/or 1270*a-c* are depicted as only displaying one graphical control element at a time that is operable to control a corresponding piece of loading dock equipment in response to user selection, in other embodiments one or more of the displays 570*a-h* and/or 1270*a-c* can include additional graphical elements that, although they may be visually representative of control elements, are not operable to control other pieces of loading dock equipment. For example, in some embodiments the "restraint" display 570*a* described above with reference to FIGS. 5A and 11A can include a representation of a dock door control element. In these embodiments, the representation of the dock door control element will not be selectable (i.e., responsive to touch) by the operator until the vehicle restraint has been properly engaged with the vehicle, at which time the visual representation of the dock door control element will change (e.g., its color will change) to signify to the operator that the dock door control element is now operable. Similarly, the representation of the vehicle restraint control element can also change (e.g., it can become opaque) to signify that it is no longer selectable while the dock door is raised.

FIGS. 14A-14M illustrate control elements for use in various embodiments of displays on a loading dock control panel touchscreen, such as one or more of displays 570*a-h*, 1070*a*, 1270*a-c* and/or 1370*a-c*. In some embodiments, controls with a relatively square border can indicate that operating the control is done by "tapping" the control, which can cause a corresponding action, even though the action can take longer than the tap. For example, tapping a square control corresponding to opening a door can cause the door to move until it is fully open (or a stop condition is performed, such as a sensor indicating a blockage or an emergency stop is pressed), despite the square control only being tapped for less than a second. In some embodiments, controls with a round border can indicate that operating the control is done by continually "pressing" the control, which can cause a corresponding action only while the control is being pressed. For example, pressing a round control corresponding to deploying a dock leveler can cause the dock leveler to move from a stored position to being raised, extending a lip, and lowering into the bed of a vehicle, all while the control is being pressed, but the movements will stop in mid-motion if the control is no longer pressed. The control elements can be modified in a number of ways such as having different borders, modified arrow shapes, different shading, etc. Versions of each of FIGS. 14A-14M are contemplated with only part of the shown design, such as without the shown borders, without shading, or with only part of the inner design (e.g., only the head of the arrows in FIGS. 14A-14F, more or less horizontal lines in FIGS. 14G and/or 14H, more or less arrow heads in FIGS. 14I-14L, or only part of the forklift shown in FIG. 14M).

The displays 570*a-h*, 1070*a*, 1270*a-c* and/or 1370*a-e* and the control elements in FIGS. 14A-14M may be implemented in any of various programming languages, such as in C++, Java, HTML (HyperText Markup Language) or any other suitable scripts or methods of creating displayable data. In addition to the displays 570*a-h*, 1070*a*, 1270*a-c* and/or 1370*a-e*, the touchscreen 354 and/or the display screen 352 can provide facilities to present information and receive input data, such as a form or page with fields to be filled in, pull-down menus or entries allowing one or more of several options to be selected, buttons, sliders, hypertext links or other known user interface tools for receiving user input as well as various icons, text and other graphs. Examples of some such interface tools and icons are shown in FIGS. 14A-14M. While certain ways of displaying information to users is shown and described with respect to certain Figures, those skilled in the relevant art will recognize that various other alternatives may be employed. The terms "display," "screen," and "page" are generally used interchangeably herein to refer to types of control elements.

Figure 6A:
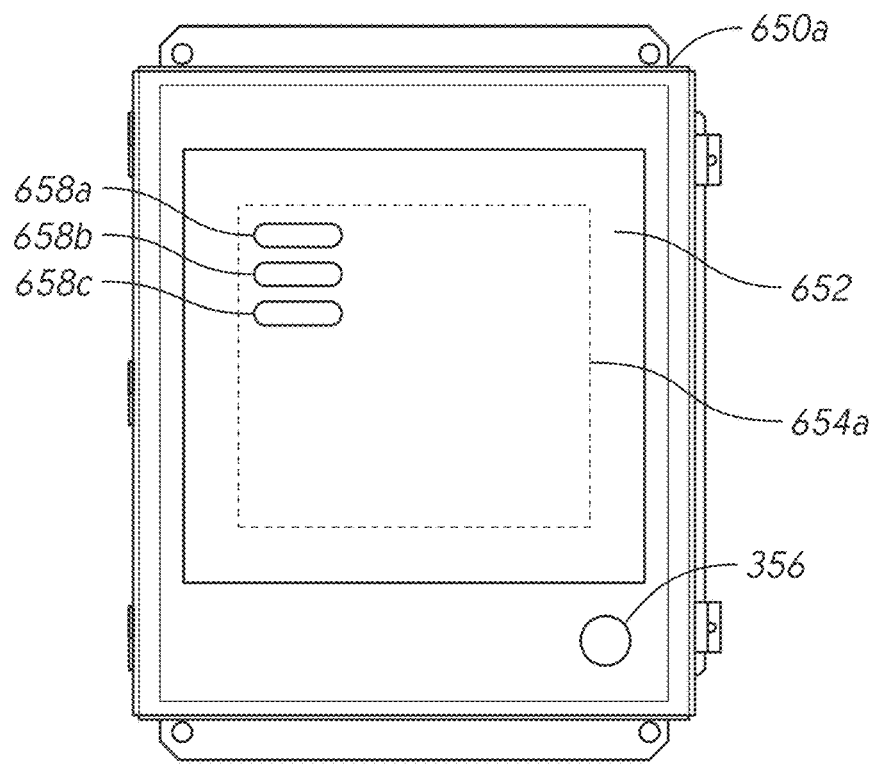
FIGS. 6A-6D are front views of loading dock control panels configured in accordance with other embodiments of the present technology.

The embodiments of control panel 250 described above with reference to FIGS. 3A and 3B show two embodiments of control panels having a touchscreen for providing sequential control of interlocked loading dock equipment in accordance with the present technology. In other embodiments, control panels having user interfaces embodying the present technology can have other configurations and/or arrangements of features without departing from the present disclosure. For example, FIG. 6A-6D are front views of corresponding control panels 650*a*-650*d* configured in accordance with other embodiments of the present technology. Referring first to FIG. 6A, in this embodiment the control panel 650*a* includes a display screen 652 (e.g., a LCD) having a touchscreen 654*a* in which vehicle restraint status indicators 658*a-c* are displayed via the touchscreen 654*a*, instead of being provided via physical lights mounted to the control panel housing, as on the embodiments of control panel 250 described above with reference to FIGS. 3A and 3B. Like the touchscreen 354, the touchscreen 654*a* can present a series of graphical user interface displays, such as the displays 570*a-h*, 1070*a*, 1270*a-c* and/or 1370*a-e* described above, for sequential control of loading dock equipment. Although the indicators 658*a-c* are displayed via the touchscreen 654*a*, they can be used to visually indicate the status of the vehicle restraint 242 in the same manner as the indicator lights 358*a*-358*c* described above with reference to FIGS. 3A and 3B. Accordingly, the first indicator 658*a* can be configured to project a red color when the vehicle restraint 242 is not engaged with a trailer at the loading dock, the second indicator 658*b* can be configured to project an amber color indicating that the vehicle restraint 242 is in the override mode and that some other form of restraint is being used to secure the trailer at the loading dock, and the third indicator 658*c* can be configured to project a green color when the vehicle restraint 242 has been properly engaged with the trailer. In addition to the touchscreen 654*a*, in this embodiment the control panel 650*a* also includes the emergency stop button 356 described above with reference to FIGS. 3A and 3B.

Figure 6B:
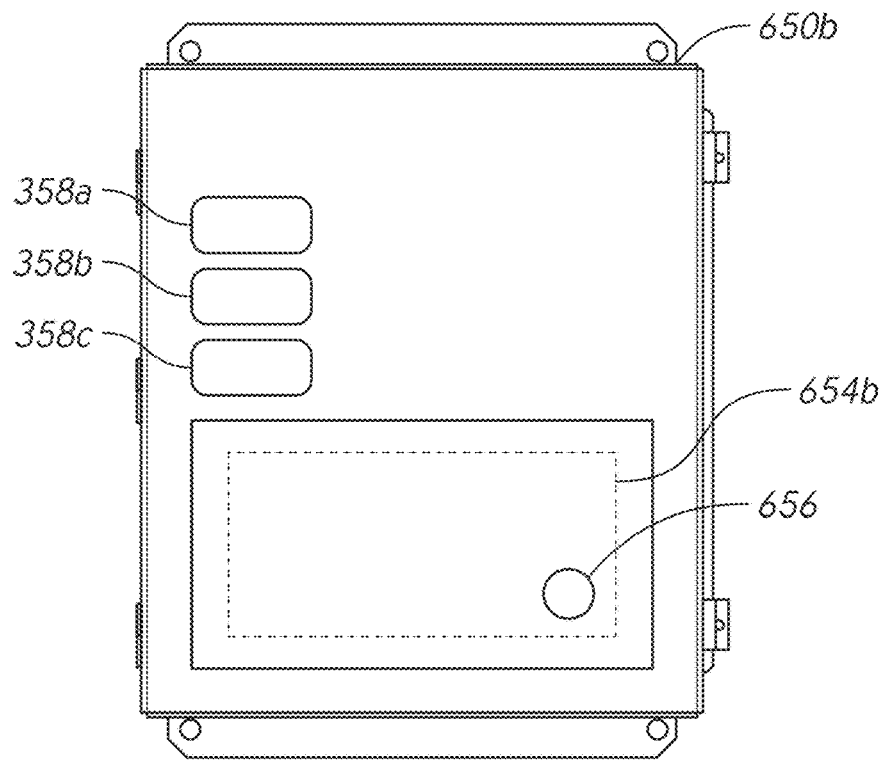
Figure 6C:
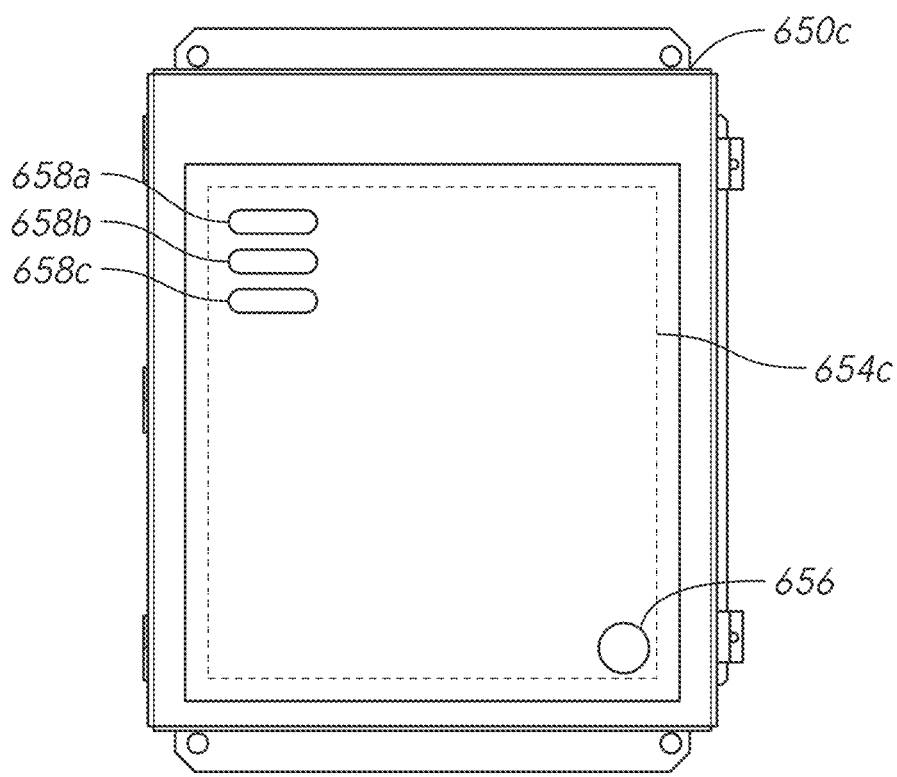

Turning next to FIG. 6B, in this embodiment the control panel 650*b* includes a touchscreen 654*b* which displays a graphical emergency stop button 656 instead of a physical button as with the emergency stop button 356 described above with reference to FIGS. 6A, 3A and 3B. In the embodiment of FIG. 6B, the control panel 650*b* includes the physical signal lights 358*a-c* which, like the embodiments of control panels 250 of FIGS. 3A and 3B, are separate from the touchscreen 654*b*. Conversely, FIG. 6C illustrates an embodiment of a control panel 650*c* in which both the indicators 658*a-c* and the emergency stop button 656 are graphically displayed via a touchscreen 654*c*.

Figure 6D:
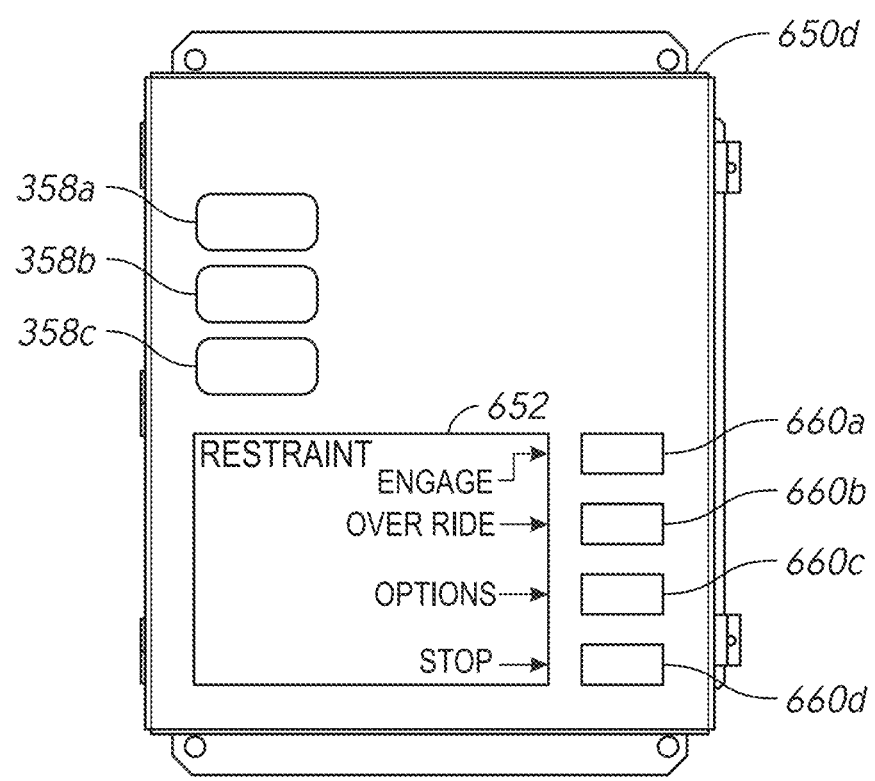

As shown in FIG. 6D, the control panel 650*d* includes the display screen 652 but lacks a touchscreen. In this embodiment, one or more controllers 660 (e.g., multifunction physical buttons; identified individually as buttons 660*a*-660*d*) are arranged alongside or otherwise adjacent to the display screen 652. The display screen 652 is configured to present a series of textual instructions, prompts, etc. that instruct and enable the operator to control loading dock equipment in an appropriate (e.g., safe) sequence by use of the buttons 660a-660d. For example, in the illustrated embodiment the display screen 652 displays textual information for control of the vehicle restraint. The information includes instructions for engaging the vehicle restraint by depressing the first button 660a or overriding the restraint by depressing the second button 660b. If the user wishes to consider other options, they can do so by selecting the third button 660c. Additionally, the operator can stop all equipment by depressing the fourth button 660d. Once the restraint has been engaged, the display screen 652 can cycle to a new display that provides similar textual and/or graphical information for control of the loading dock door (for example, in a manner that is at least generally similar to the process described above with reference to FIG. 5B or 11B). In this embodiment, the functions of the buttons 660a-c will change depending on which piece of dock equipment is associated with a particular display, so that depressing the buttons controls the corresponding piece of equipment. In the embodiment of FIG. 6D, the control panel 650b includes the physical signal lights 358a-358c which, like the embodiments of control panel 250 of FIGS. 3A and 3B, are separate from the display screen 652.

Figure 7:
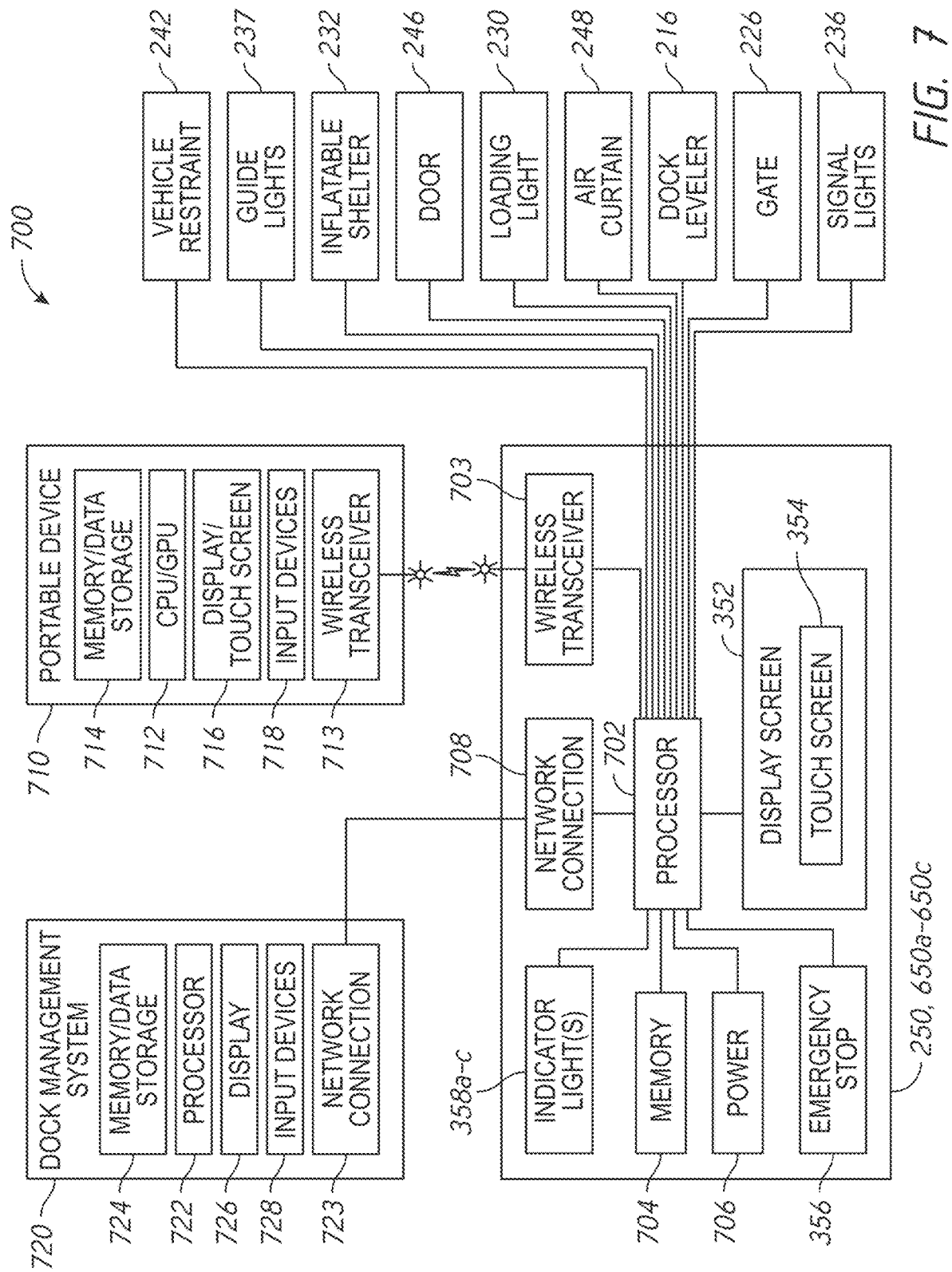
FIG. 7 is a schematic diagram of a loading dock equipment control system configured in accordance with an embodiment of the present technology.

FIG. 7 is a schematic diagram of a loading dock equipment control system 700 on which various embodiments of the present technology can be implemented. The control system 700 includes the control panel 250 (or one of the control panels 650a-650c). Although the discussion that follows refers to the control panel 250, it will be understood that the discussion applies to any of the control panels described herein as well as other control panels configured in accordance with the present technology. The control panel 250 can comprise hardware and software components that execute the dock equipment control methods and systems described in detail above. For example, the control panel 250 can include one or more user input devices, such as the touchscreen 354, physical buttons, switches, etc. that provide user inputs to a processor 702, notifying it of actions. The actions can be mediated by a hardware controller that interprets the signals received from the input devices and communicates the information to the processor 702 using a suitable communication protocol. Although not shown, in other embodiments the control panel 250 can include other input devices such as, for example, a keypad, a touch pad, a joystick, a microphone, and/or other user input devices. The processor 702 may be any suitable logic processing unit, such as one or more programmable logic controllers (PLCs), central processing units (CPUs), digital signal processors (DSPs), application-specific integrated circuits (ASIC), etc.

The control panel processor 702 is operably connected to the indicator lights 358a-c, the emergency stop 356, and the loading dock equipment at the associated loading dock to receive operational signals and provide operating commands to the equipment as described in detail above. This equipment can include, for example, the vehicle restraint 242, the guide lights 237, the inflatable shelter 232, the dock door 246, the loading light 230, the air curtain 248, the dock leveler 216, the gate 226, and/or the signal lights 236. The communications between the control panel 250 and the various pieces of dock equipment may be facilitated by wired connections, wireless connections, or some combination thereof and can include cellular, Wi-Fi, Bluetooth, or any other conventional or suitable communications protocol known in the art.

The processor 702 can be a single processing unit or multiple processing distributed across multiple devices for performing the routines described above. The processor 702 can be coupled to other hardware devices, for example, with the use of a bus, such as a USB, PCI bus or a SCSI bus. The processor 702 has access to a memory 704 that includes one or more devices for volatile or non-volatile storage, and can include read-only and/or writable memory. The memory 704 can include program memory that stores programs and software for executing the various user input display sequences described above, as well as an operating system, global application modules, and/or other application programs. The processor 702 receives power from a power source 706, which can include facility power or a local power source, such as a battery.

Examples of the display screen 350 include an LCD screen, an LED screen, a projected display, and so on. As described above, the touchscreen 354 can be a resistive touchscreen, a capacitive touchscreen, a surface wave touchscreen, and/or other touch-sensitive display and input devices known in the art. By way of example, one suitable touchscreen that can be used with the control panel 250 is a model G307K Kadet 2. Operator Interface with a seven inch TFT (thin film transistor) color display, which can be obtained from Red Lion Controls, Inc. of 20. Willow Springs Circle, York, Pennsylvania, 17406, USA. In other embodiments, other suitable touchscreens can be used.

In some embodiments, the control panel 250 can communicate with other devices (or a server) wirelessly or wire-based with a network node. For example, the control panel 250 can include a wireless transceiver 703 and a network connection 708. The wireless transceiver 703 can include a Wi-Fi access point, a Bluetooth transceiver, a near-field communication (NFC) device, and/or a wireless modem or cellular radio utilizing GSM, CDMA, 3G and/or 4G technologies suitable for data communications with, e.g., all manner of remote processing devices. For example, the wireless transceiver 703 can facilitate wireless communication with the portable device 710 when the portable device 710 is either in the proximity of the control panel 250 or remote therefrom. Additionally, the control panel 250 further includes a network connection 708 that can include, for example, a wired connection, such as an Ethernet port, cable modem, Fire Wire cable, Lightning connector, USB port, etc. suitable for wired communication with all manner of remote processing devices, such as the dock management system 720.

In some embodiments, the control system 700 can also include a portable device 710, and/or a dock management system 720. The portable device 710 can be virtually any hand-held processing device (e.g., a hand-held device such as a smartphone, tablet, or other portable electronic device, etc.) having processing, display, user input/output and remote communication features. For example, in one embodiment the portable device 710 can be a smartphone or other known mobile device having a CPU and/or a graphics processing unit (GPU) 712 for executing computer-readable instructions and application programs stored on memory 714. In addition, the portable device 710 can include an internal power source or battery, a display/touchscreen 716, and various other input devices 718 (e.g., a key pad, microphone, etc.). In addition to the foregoing features, the portable device 710 can include a mobile operating system (OS) and/or a device wireless transceiver 713 that can include one or more antennas for wirelessly communicating with, for example, other mobile devices, websites, and the control panel 250.

In the illustrated embodiment, the dock management system 720 can be a conventional dock management system centrally located at a facility for remotely monitoring and managing activities at a plurality of loading docks at the facility. For example, embodiments of the dock management system 720 can be at least generally similar in structure and function to the systems described in U.S. Pat. No. 7,119,673, which is incorporated herein by reference in its entirety. More specifically, the dock management system can include a CPU or processor 722 that receives user input via various input devices 728, such as a keyboard, touchscreen, mouse, etc., and can display information for user viewing via a display screen 726. The processor 722 can execute computer-readable instructions stored in memory 724. In addition to these features, the dock management system 720 includes a network connection 723 which can be coupled via a wired connection to the network connection 708 of the control panel 250. In other embodiments, the dock management system 720 can communicate with the control panel 250 via a wireless connection. The network connection 723 can also enable the dock management system 720 to connect to a network for exchanging information and/or commands with the control panel 250 and/or other systems. The network may be a public network, such as the Internet, an intranet, a wireless area network (WAN), a local area network (LAN), a telephone system or any other suitable network useful for transporting, communicating or conveying data. In some embodiments, the dock management system 720 and/or portions thereof can be generally similar and structure and function to the 4SIGHT™ Dock Management System provided by 4Front Engineered Solutions, Inc., of 1612 Hutton Drive, Suite 140, Carrollton, Texas 75006.

In some embodiments, authorization codes or other information can be pushed from the dock management system 720 to one or more instances of the control panels 250 at a facility. For example, the dock management system 720 can push to all instances of the control panels 250 an authorization code, a software update, an alarm (e.g., fire alarm), or other building or operational data. In some embodiments, when a password is pushed to the control panel 250, a corresponding authorization level can be set at the control panel 250. For example, at a certain point (e.g., the start of business hours) an automated or manual process can push passwords to all instances of the control panels 250 at a facility, causing all the instances of the control panels 250 to become unlocked (e.g., available to accept input). Similarly, at another point (e.g., at the end of business hours) the automated or manual process can send a further code to all the instances of the control panels 250, causing them to become locked (e.g., unavailable to accept input).

As described above with reference to FIGS. 5A-5H, 11A-11H and 12A-12C, in some embodiments a dock operator located at a particular loading dock can operate the interlocked loading dock equipment via the touchscreen 354 of the control panel 250. In other embodiments, the loading dock equipment can be controlled in accordance with the methods and systems described above by use of the portable device 710. For example, the portable device 710 (e.g., a smartphone) may be carried by a dock operator, or located on a movable piece of equipment such as a lift truck or other inter-plant vehicle. In this embodiment, the portable device 710 contains an application program stored in the memory 714 that, when executed by the CPU 712 enables the dock operator to control the loading dock equipment via the portable device 710 instead of the control panel 250. More specifically, the operator can access the program by touching an appropriate icon on the display 716 and/or inputting, for example, a unique identification code. The CPU 712 can respond to this input by establishing communication with the control panel 250 via the wireless connection between the wireless transceiver 713 and the wireless transceiver 703. The displays 570a-h, 1070a, 1270a-c and/or 1370a-c, described in detail above, can then be displayed for the operator via the display/touchscreen 716 on the portable device 710, and the operator can operate the loading dock equipment in the manner described above via the display/touchscreen 716 on the portable device 710 instead of the control panel 250.

In another embodiment, the portable device 710 (e.g., a tablet, smart phone, etc.) can be detachably mounted to the control panel 250 via a docking station that enables direct electrical connection between the device 710 and the control panel 250. In this embodiment, the operator can interface with the portable device 710 as part of the control panel 250 to control the loading dock equipment, or the operator can detach the portable device 710 from the panel 250 and control the dock equipment remotely.

In a further embodiment, a dock operator can remotely control the loading dock equipment at a particular loading dock via the dock management system 720 (or via the dock management system 720 in combination with local control inputs, either via the control panel 250 or via the nearby wireless device 710). In this embodiment, the dock operator can be located at a central location at the loading dock facility remote from a particular loading dock, but can access the control panel 250 at the loading dock by selecting and/or otherwise inputting an appropriate dock identifier via the dock management display 726 and/or one of the input devices 728. Once communication is established with the control panel 250 at the particular loading dock, a sequence of displays (e.g., 570a-h, 1070a, 1270a-c and/or 1370a-e described in detail above with reference to FIGS. 5 and 10-13) can be displayed via the dock management system display 726, and the dock operator can operate the loading dock equipment via one or more of the displays 570a-h, 1070a, 1270a-c and/or 1370a-e as described above. Since the dock operator is not present at the loading dock in this embodiment, it may be advantageous to include a video camera or other similar viewing device at the loading dock directed toward, e.g., at least the dock door 246 and the dock leveler 216. Images from the camera can be transmitted to the processor 722 and displayed on the display 726 to enable the dock operator to remotely view operation of at least some of the loading dock equipment (e.g., the dock leveler 216) during the dock sequence to confirm proper operation.

In the embodiments described above involving use of the portable device 710 and the dock management system 720, the display screen 352 and the touchscreen 354 on the control panel 250 may not be necessary and may be omitted, while the control panel 250 can retain the indicator lights 358a-c and the emergency stop 356. Accordingly, one advantage of these embodiments is that the control panel 250 can be less expensive to manufacture since it will not need to include a display or touchscreen. Moreover, in these embodiments a single user interface device (e.g., the portable device 710 or the dock management system 720) can be used to remotely control the loading dock equipment at multiple loading docks at a facility.

Figure 8:
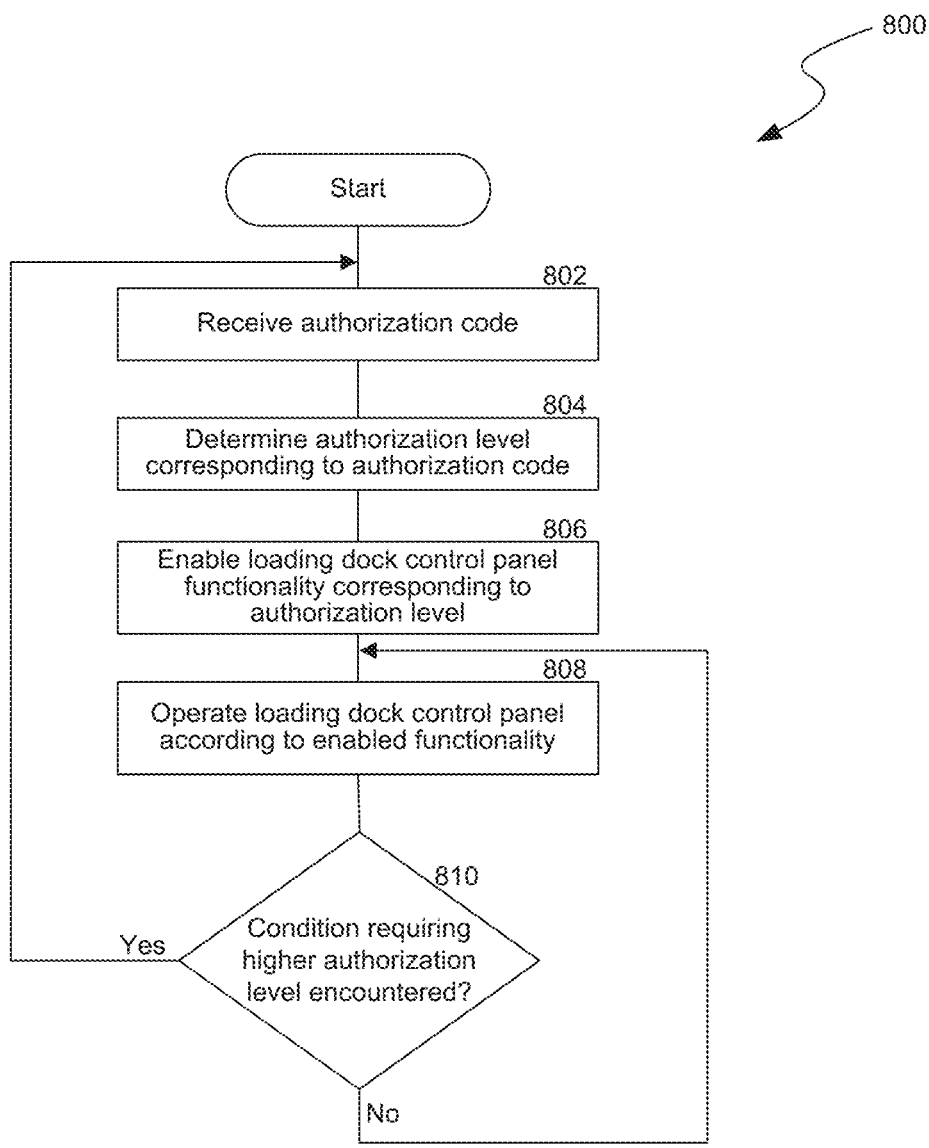
FIG. 8 is a flow diagram of a routine for operating a loading dock control panel with functionality corresponding to a user authorization level in accordance with an embodiment of the present technology.

FIG. 8 is a flow diagram illustrating a process 800 for operating a loading dock control panel with functionality corresponding to a user authorization level, in accordance with an embodiment of the present technology. In some embodiments, the process 800 can be performed by the control panel 250.

In block 802, the process 800 can receive an authorization code. In some embodiments, the authorization code can be provided, e.g., via display 1070*a*, when the control panel 250 is powered on or re-enters "active mode" from "sleep mode." In some embodiments, the authorization code can be provided from a remote source, such as the portable device 710 or the dock management system 720. Display 1070*a* can include indications that the user should enter an authorization code and can include an interface, such as a soft keypad, to enter the code. In some embodiments, the authorization code can be provided to upgrade a current authorization level e.g., via display 1270*b*. In various embodiments, an authorization code can be received as a sequence of numerals, letters, symbols, patterns, spoken commands, biometric readings (e.g., fingerprint scan, voice recognition, etc.) or any combination thereof.

In block 804, the process 800 can identify an authorization level corresponding to the authorization code received in block 802. The control panel 250 can include a mapping (e.g., database, file, list of identifiers, hardcoded identifiers, etc.) of various authorization codes to authorization levels. For example, codes assigned to dock operators can be mapped to a first level of authorization, codes assigned to dock supervisors can be given a second level of authorization, codes assigned to facility managers can be given a third level of authorization, and codes assigned to control panel administrators can be given a fourth level of authorization. Other code mappings are contemplated, such as codes assigned to dock operators mapped to a first level of authorization while codes assigned to manager personnel (e.g., dock supervisors, facility managers, and administrators) can be given a second level of authorization. In some embodiments, the mapping of authorization codes to authorization levels can be stored and implemented at the control panel 250. In other embodiments, the control panel 250 can use a network connection to the dock management system 720, which can use a mapping to identify the authorization level and provide an indication of the authorization level back to the control panel 250.

In block 806, the process 800 can enable or disable loading dock control panel functionality corresponding to the authorization level determined in block 804. For example, at the first level of authorization, only the normal operation sequence and basic control panel settings are available to the current user. At the second level of authorization, other operations are available such as skipping use of the vehicle restraint by instead indicating use of a wheel chock, manually opening a door, selecting other dock equipment to operate, etc. At the third level of authorization, additional controls and system checks can be available, such as accessing control panel settings, internal state, usage statistics, maintenance reports and automated maintenance, alerts, and event logs. At the fourth level of authorization, administrator access can be grated, e.g., to upgrade control panel software or access debugging controls. In some embodiments, any of the levels of authorization can be established differently, such as levels of authorization can be merged or further segmented. For example, the second through the fourth levels of authorization can be merged or the third level of authorization can be split into additional levels.

In block 808, the process 800 can operate the loading dock control panel according to the functionality enabled or disabled in block 806. For example, controls in the display 1370*a*-1370*e* can be shown or enabled or can be hidden or disabled, various sub-sequences of displays can be included or excluded from a current sequence, inputs and outputs to the control panel 250 can be enabled or disabled, and/or control for various items of loading dock equipment can be enabled or disabled. In some embodiments, the current authorization level can be a basis for determining which sub-sequence of control elements to provide on the control panel 250, as described in greater detail below in relation to FIG. 9.

In some embodiments, the level of authorization can be increased or decreased during operation of the control panel. In block 810, the process 800 can determine whether a condition requiring a higher authorization level has been encountered. For example, a user can establish the first level of authorization by entering a first code when beginning use of the control panel. Upon determining that the vehicle restraint 216 cannot be engaged, the user (or another user either locally or remotely) can enter a second code to upgrade the level of authorization to the second level. In some embodiments, an elevated authorization level can only exist for a limited extent, such as a specified period of time, until a particular operation is completed (e.g., until he current load or unload cycle as terminated), or until a deauthorization command or sign-out of the control panel 250 is received. In various embodiments, when an authorization level is decreased, an option can be presented to reauthorize at the previous authorization level or processing can return to block 804 to establish control panel functionality at a lower authorization level (e.g., the authorization level that existed prior to a previous upgrade in authorization level). If in block 810 a condition requiring a higher authorization level is encountered, the process 800 can return to block 802. Otherwise, the process 800 can return to block 808.

Figure 9:
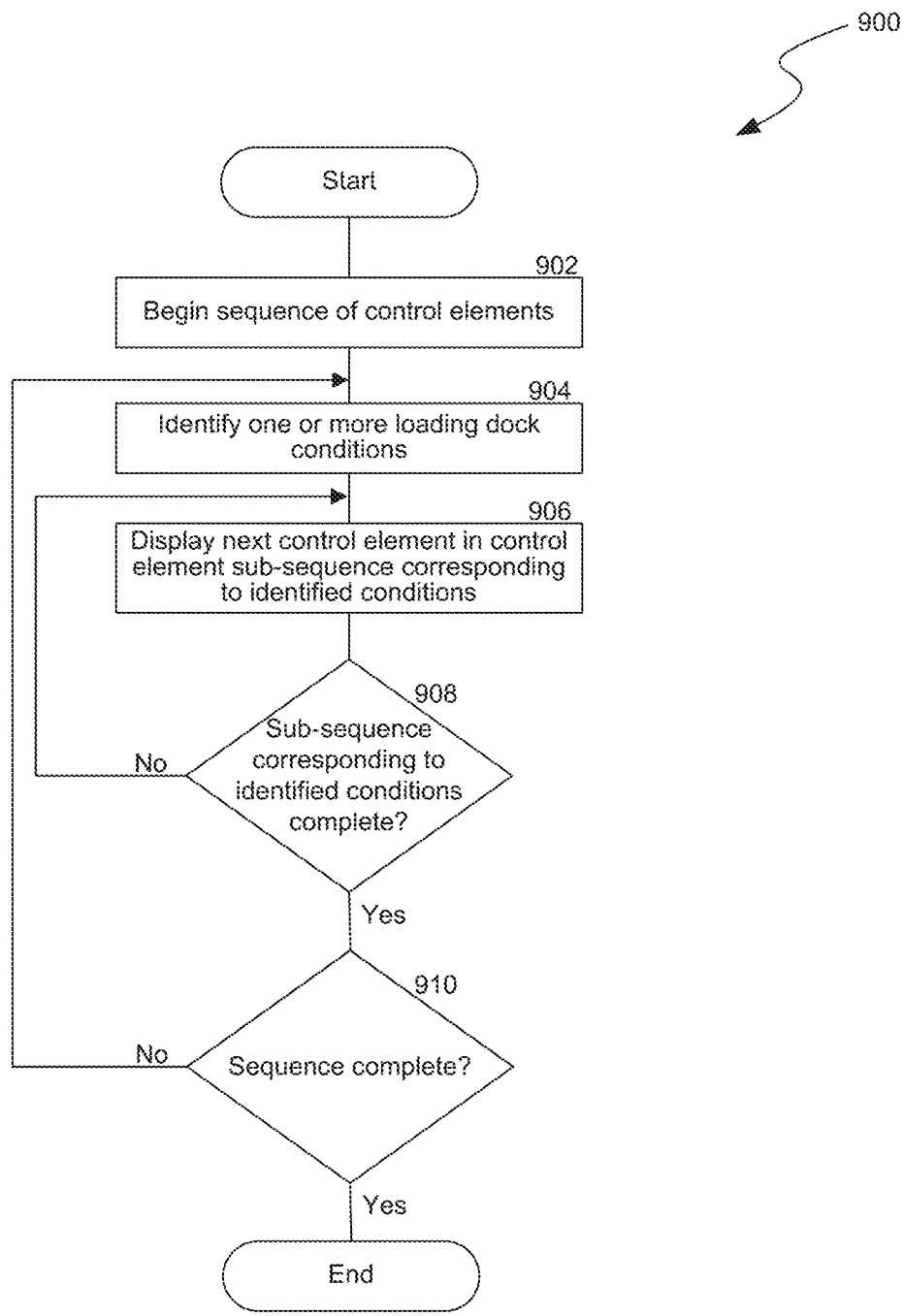
FIG. 9 is a flow diagram of a routine with conditional control element sub-sequences for operating a loading dock control panel configured in accordance with an embodiment of the present technology.
Figure 10B:
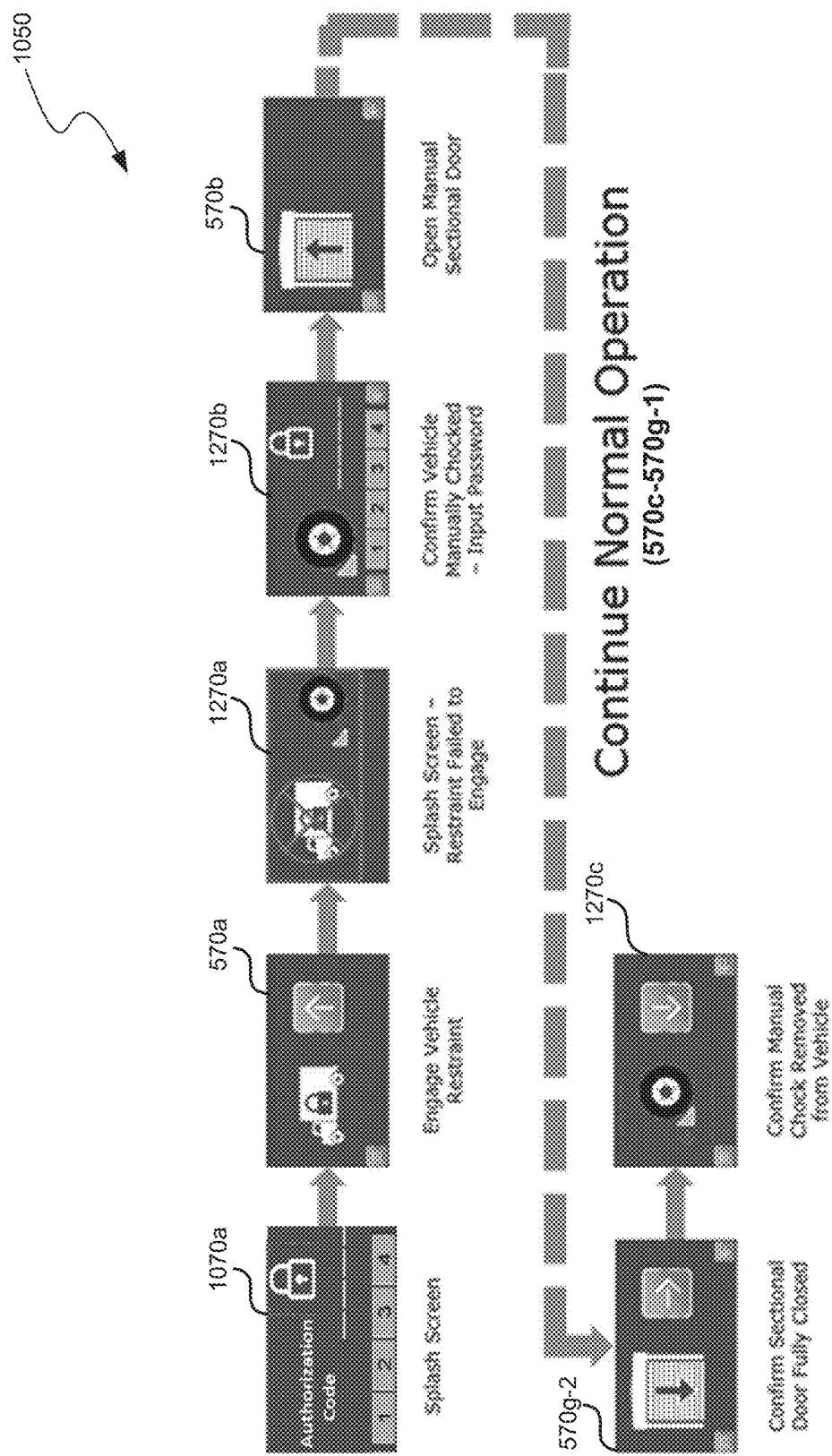

FIG. 9 is a flow diagram illustrating a process 900 for operating loading dock equipment with a loading dock control panel configured to provide conditional sub-sequences of control elements in accordance with an embodiment of the present technology. In some embodiments, the process 900 can be performed by the control panel 250.

In block 902, the process 900 can begin a sequence of control elements. The control elements can be control panel displays (e.g., the displays 570*a*-*h*, 1070*a*, 1270*a*-*c* and/or 1370*a*-*c*) or portions of control panel displays (e.g., the control elements 572-587, 1102-1118, 1272-1288, 1372-1396, and/or the control elements shown in FIGS. 14A-14M. The sequence of control elements can be based on one or more of: a current authorization level (as described above in relation to FIG. 8), an identified configuration of the loading dock 210, a current status of the loading dock 210, a current status of the control panel 250, a signal from an external computing system and/or a user selection through the control panel 250. For example, the sequence can be the normal operation sequence described above in relation to FIG. 10A, which can be selected by default when the control panel 250 is powered on.

In block 904, the process 900 can identify one or more loading dock conditions. The loading dock conditions can include one or more of: a current level of authorization, a loading dock equipment configuration, various loading dock sensor inputs, values tracked by the control panel 250, user specified conditions, and/or controls from an external computing system.

Conditions based on the current level of authorization can be levels of authorization based on user-entered authorization codes, as described above in relation to FIG. 8. In some embodiments, a first condition can occur, such as a user selecting an override in the sequence or a detected error, such as a detection that the vehicle restraint 242 did not properly engage. However, for a corresponding sub-sequence of controls elements to be used, such as the proceeding to the display 570b and using the display 1270c, a different authorization level must be attained. The determination that such an authorization escalation is necessary can be the condition identified in block 904. Alternatively, the authorization condition can be the control panel 250 being in a particular state, such as having been just powered on, or the authorization condition can be a user input such as a selection of the control element 1384 for changing authorization.

Conditions based on the loading dock equipment configuration can be a determination of the equipment connected to the control panel 250 or otherwise at the loading dock 210. This determination can be made by the control panel 250 electronically determining components connected to it or based on user input, e.g., entering configuration information to the control panel 250 indicating which equipment is present. Examples conditions can be whether the loading dock 210 has a door, whether the door is controlled through the control panel 250 or manually controlled by the dock operator, what type of dock leveler is connected to the control panel 250, what type of vehicle restraint is connected to the control panel 250, etc. In some implementations, various sub-sequences of control elements can be automatically included, excluded, or modified based on the configurations of the loading dock 210. For example, a first sub-sequence can be included for a configuration with an automatic door while a second sub-sequence can be provided for a configuration with a manual door.

The control panel 250 can receive various sensor inputs such as for a status of the vehicle restraint 242, a status of the door 246, a status of the dock leveler 216, a status of the barrier gate 226, etc. The control panel 250 can also receive sensor inputs for the environment of the loading dock 210, such as whether a vehicle is present or indications of people in the way of the door 226 or the dock leveler 216. Any of these values can be used as the condition for presenting an alternate sub-sequence of control elements. In addition, the control panel 250 can track additional values and statistics for the loading dock 210, such as number of uses of various equipment, maintenance history, and/or event history (e.g., the values shown in displays 1370b and 1370c).

Additional conditions can be specified by user interactions with the control panel 250. For example, a user can select a control to initiate an alternate sub-sequence of control elements, such as to override the vehicle restraint, skip a current control element in the sequence, select an alternate item of equipment to control, activate a menu, etc.

Conditions can also be based on controls from a computing system external to the control panel 250. For example, a user of the portable device 710 or the dock management system 720 can send various controls which can be delivered to the control panel 250, e.g., via a network, USB, or other connection. These types of conditions can be remote versions of any of the conditions discussed above, such as a user entering an authorization code, scheduling maintenance, activating a vehicle restraint override, pressing a control element, etc.

In some embodiments, a condition identified in block 904 can be a combination of the conditions discussed above. For example, a condition can be identified as both a user selection of a control element and an identification that use of the selected control element requires a higher authorization level.

The condition identified in block 904 can correspond to a sub-sequence of one or more control elements for the control panel 250 to display next. In some cases, the identified condition can be a default state, indicating that a typical sub-sequence of the sequence begun at block 902 should proceed. For example, the sequence shown in FIG. 10A includes the normal operation sequence which can occur when there is no condition for overriding the vehicle restraint 242. This is opposed to the override sequence shown in FIG. 10B, which can occur in response to an override condition. In block 906, the process 900 can display a control element in the sub-sequence corresponding to the conditions identified in block 904. In some embodiments, one or more control elements can be configured to receive user interactions, and the control panel 250 can, in response to the user interactions, cause corresponding interfaces of the control panel 250 to provide control signals to operate the attached equipment.

The process 900 can iteratively loop between blocks 906 and 908 until the sub-sequence corresponding to the condition identified at block 904 is complete. The process 900 can continue to identify conditions and display sub-sequences of control elements, as shown in block 910, until the sequence begun in block 902 is complete.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like. The foregoing discussion provides a brief, general description of a suitable computing environment in which the invention can be implemented. Although not required, aspects of the invention are described in the general context of computer-executable instructions, such as routines executed by a general-purpose data processing device, e.g., a PLC, wireless device, personal computer or server computer. Those skilled in the relevant art will appreciate that aspects of the invention can be practiced with other data processing, communications, or computer system configurations, including: Internet appliances, hand-held devices (including personal digital assistants (PDAs)), wearable computers, all manner of cellular or mobile phones (including Voice over IP (VOIP) phones), dumb terminals, media players, multiprocessor systems, microprocessor-based or programmable consumer electronics, network PCs, mini-computers, mainframe computers, and the like. Indeed, the terms "computer," "processor" and the like are generally used interchangeably herein, and can refer to any of the above devices and systems, as well as any data processor.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media (e.g., non-transitory computer-readable media), including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

The terminology used herein is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further embodiments of the invention. Some alternative embodiments of the invention may include not only additional elements to those embodiments noted above, but also may include fewer elements. Further any specific numbers noted herein are only examples: alternative embodiments may employ differing values or ranges.

While the above description describes various embodiments of the invention and the best mode contemplated, regardless how detailed the above text, the invention can be practiced in many ways. Details of the system may vary considerably in its specific embodiment, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims. Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A control panel for controlling operation of a plurality of pieces of loading dock equipment at a loading dock, the control panel comprising:
a display screen configured to—
  display a first control element, wherein user interaction with the first control element causes activation of a function of a first one of the pieces of loading dock equipment; and
  automatically display a second control element in the absence of the first control element after receiving a signal from the first one of the pieces of loading dock equipment indicating that the function of the first one of the pieces of loading dock equipment has been completed or has not been completed, wherein:
    when the signal indicates that the function of the first one of the pieces of loading dock equipment has been completed, user interaction with the second control element causes activation of a function of a second one of the pieces of loading dock equipment; and
    when the signal indicates that the function of the first one of the pieces of loading dock equipment has not been completed, the second control element provides an indication to the user to engage an alternate one of the pieces of loading dock equipment.

2. The control panel of claim 1 wherein the first one of the pieces of loading dock equipment is a vehicle restraint.

3. The control panel of claim 2 wherein the function of the vehicle restraint comprises engaging the vehicle restraint with a vehicle.

4. The control panel of claim 1 wherein the second one of the pieces of loading dock equipment is an inflatable shelter, a loading dock door, a loading light, an air curtain, a dock leveler, or a safety gate.

5. The control panel of claim 1 wherein the second one of the pieces of loading dock equipment is a loading dock door.

6. The control panel of claim 5 wherein the function of the loading dock door comprises opening the loading dock door.

7. The control panel of claim 1 wherein the display screen is further configured to automatically display a third control element in the absence of the second control element and the first control element after receiving a signal indicating that the function of the second one of the pieces of loading dock equipment has been completed, wherein user interaction with the third control element causes activation of a function of a third one of the pieces of loading dock equipment.

8. The control panel of claim 7 wherein—
the first one of the pieces of loading dock equipment is a vehicle restraint;
the second one of the pieces of loading dock equipment is a loading dock door; and
the alternate one of the pieces of loading dock equipment is an alternate vehicle restraint.

9. A system for controlling operation of a plurality of pieces of loading dock equipment at a loading dock, the system comprising:
a display screen;
a processor operably connected to the display screen; and
a computer-readable medium containing non-transitory instructions that, when executed by the processor, cause the processor to—
  display, via the display screen, a first control element, wherein user interaction with the first control element causes activation of a function of a first one of the pieces of loading dock equipment; and
  automatically display, via the display screen, a second control element in the absence of the first control element after receiving a signal from the first one of the pieces of loading dock equipment indicating that the function of the first one of the pieces of loading dock equipment has been completed or has not been completed, wherein:
    when the signal indicates that the function of the first one of the pieces of loading dock equipment has been completed, user interaction with the second control element causes activation of a function of a second one of the pieces of loading dock equipment; and
    when the signal indicates that the function of the first one of the pieces of loading dock equipment has not been completed, the second control element provides an indication to the user to engage an alternate one of the pieces of loading dock equipment.

10. The system of claim 9 wherein the first one of the pieces of loading dock equipment is a vehicle restraint.

11. The system of claim 10 wherein the function of the vehicle restraint comprises engaging the vehicle restraint with a vehicle.

12. The system of claim 9 wherein the second one of the pieces of loading dock equipment is an inflatable shelter, a loading dock door, a loading light, an air curtain, a dock leveler, or a safety gate.

13. The system of claim 9 wherein the second one of the pieces of loading dock equipment is a loading dock door.

14. The system of claim 13 wherein the function of the loading dock door comprises opening the loading dock door.

15. The system of claim 9 wherein the non-transitory instructions, when executed by the processor, further cause the processor to automatically display, via the display screen, a third control element in the absence of the second control element and the first control element after receiving a signal indicating that the function of the second one of the pieces of loading dock equipment has been completed, wherein user interaction with the third control element causes activation of a function of a third one of the pieces of loading dock equipment.

16. The system of claim 15 wherein—
the first one of the pieces of loading dock equipment is a vehicle restraint;
the second one of the pieces of loading dock equipment is a loading dock door; and
the alternate one of the pieces of loading dock equipment is an alternate vehicle restraint.

17. A loading dock system, comprising:
a first piece of loading dock equipment;
a second piece of loading dock equipment; and
a control panel, comprising—
  a display screen;
  a processor operably connected to the display screen; and
  a computer-readable medium containing non-transitory instructions that, when executed by the processor, cause the processor to—
    display, via the display screen, a first control element, wherein user interaction with the first control element causes activation of a function of the first piece of loading dock equipment; and
    automatically display, via the display screen, a second control element in the absence of the first control element after receiving a signal from the first piece of loading dock equipment indicating that the function of the first piece of loading dock equipment has been completed or has not been completed, wherein:

when the signal indicates that the function of the first one of the pieces of loading dock equipment has been completed, user interaction with the second control element causes activation of a function of the second piece of loading dock equipment; and when the signal indicates that the function of the first one of the pieces of loading dock equipment has not been completed, the second control element provides an indication to the user to engage an alternate one of the pieces of loading dock equipment.

18. The loading dock system of claim 17 wherein the first piece of loading dock equipment is a vehicle restraint.

19. The loading dock system of claim 18 wherein the second piece of loading dock equipment is a loading dock door.

20. The loading dock system of claim 17 wherein the first piece of loading dock equipment, the second piece of loading dock equipment, and the control panel are each positioned proximate to a loading dock station.

\* \* \* \* \*